US012596322B2

(12) United States Patent
Shinoda et al.

(10) Patent No.: US 12,596,322 B2
(45) Date of Patent: Apr. 7, 2026

(54) THICKNESS DETECTION DEVICE, SHEET PROCESSING APPARATUS, AND IMAGE FORMING SYSTEM

(71) Applicants: Atsushi Shinoda, Kanagawa (JP); Yuusuke Shibasaki, Kanagawa (JP); Shuuto Tohkaishi, Kanagawa (JP); Sho Asano, Kanagawa (JP); Wataru Takahashi, Kanagawa (JP); Tomomichi Hoshino, Kanagawa (JP); Kotomi Kameyama, Kanagawa (JP); Satoshi Hirata, Kanagawa (JP); Shingo Yoshizawa, Kanagawa (JP); Suzuka Fujita, Kanagawa (JP); Naofumi Yoshida, Kanagawa (JP); Ryota Takayama, Kanagawa (JP); Hirotaka Yasukawa, Kanagawa (JP); Yoshito Suzuki, Kanagawa (JP); Shinya Monma, Kanagawa (JP); Yuji Suzuki, Kanagawa (JP); Wataru Nozaki, Kanagawa (JP); Jun Yamada, Kanagawa (JP); Naohiro Yoshida, Kanagawa (JP); Yusuke Hirono, Kanagawa (JP); Takahiro Watanabe, Kanagawa (JP); Yohsuke Haraguchi, Kanagawa (JP)

(72) Inventors: Atsushi Shinoda, Kanagawa (JP); Yuusuke Shibasaki, Kanagawa (JP); Shuuto Tohkaishi, Kanagawa (JP); Sho Asano, Kanagawa (JP); Wataru Takahashi, Kanagawa (JP); Tomomichi Hoshino, Kanagawa (JP); Kotomi Kameyama, Kanagawa (JP); Satoshi Hirata, Kanagawa (JP); Shingo Yoshizawa, Kanagawa (JP); Suzuka Fujita, Kanagawa (JP); Naofumi Yoshida, Kanagawa (JP); Ryota Takayama, Kanagawa (JP); Hirotaka Yasukawa, Kanagawa (JP); Yoshito Suzuki, Kanagawa (JP); Shinya Monma, Kanagawa (JP); Yuji Suzuki, Kanagawa (JP); Wataru Nozaki, Kanagawa (JP); Jun Yamada, Kanagawa (JP); Naohiro Yoshida, Kanagawa (JP); Yusuke Hirono, Kanagawa (JP); Takahiro Watanabe, Kanagawa (JP); Yohsuke Haraguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/938,565

(22) Filed: Nov. 6, 2024

(65) Prior Publication Data

US 2025/0237987 A1 Jul. 24, 2025

(30) Foreign Application Priority Data

Jan. 18, 2024 (JP) ................................ 2024-006340

(51) Int. Cl.
*G03G 15/00* (2006.01)
*B31F 5/00* (2006.01)
*B31F 5/02* (2006.01)

(52) U.S. Cl.
CPC ......... *G03G 15/6544* (2013.01); *B31F 5/001* (2013.01); *B31F 5/02* (2013.01); *G03G 2215/00738* (2013.01)

(58) Field of Classification Search
CPC ...... G03G 15/6544; G03G 2215/00738; B31F 5/001; B31F 5/02
See application file for complete search history.

(56) References Cited

U.S. PATENT DOCUMENTS

2009/0268957 A1* 10/2009 Duss ........................ B65H 5/32
382/141
2011/0095469 A1* 4/2011 Williams .................. B42B 9/00
270/58.08

(Continued)

FOREIGN PATENT DOCUMENTS

JP 2021-024678 A 2/2021

*Primary Examiner* — David H Banh
(74) *Attorney, Agent, or Firm* — Harness, Dickey & Pierce, P.L.C.

(57) ABSTRACT

A thickness detection device for detecting a thickness of an object includes a thickness-direction moving member and a thickness detector. The thickness-direction moving member is held to be movable in a direction of the thickness by the object inserted into a cavity having an opening that opens in a plurality of directions. The thickness detector detects the thickness-direction moving member moved by the object (Continued)

inserted into the cavity to detect the thickness of the object. The thickness-direction moving member has a portion to face the object inserted into the cavity. The portion has a shape inclined relative to an insertion direction of the object.

8 Claims, 26 Drawing Sheets

(56) References Cited

U.S. PATENT DOCUMENTS

2011/0309563 A1* 12/2011 Togawa ............ G03G 15/6544
270/58.11
2012/0083400 A1 4/2012 Shibasaki et al.
2012/0153556 A1 6/2012 Sugiyama et al.
2013/0067760 A1* 3/2013 Husted ..................... G01B 5/06
33/783
2013/0113154 A1 5/2013 Furuhashi et al.
2013/0276526 A1* 10/2013 Wang .................. G01N 33/346
73/159
2014/0138896 A1 5/2014 Yoshida et al.
2014/0203487 A1 7/2014 Hoshino et al.
2014/0203488 A1 7/2014 Hidaka et al.
2014/0213425 A1 7/2014 Sugiyama et al.
2015/0360899 A1 12/2015 Takahashi et al.
2016/0340144 A1 11/2016 Sakano et al.
2016/0340145 A1 11/2016 Kunieda et al.
2016/0360053 A1 12/2016 Suzuki et al.
2017/0174465 A1 6/2017 Morinaga et al.
2017/0217239 A1 8/2017 Suzuki et al.
2018/0086590 A1* 3/2018 Mizutani ................ B65H 37/04
2018/0259895 A1 9/2018 Shibasaki et al.
2020/0307936 A1* 10/2020 Sugawara ............. B65H 9/004
2020/0307944 A1 10/2020 Shibasaki et al.
2020/0307945 A1 10/2020 Mori et al.
2021/0078813 A1* 3/2021 Izumiya ................ B65H 5/062
2021/0403273 A1 12/2021 Haraguchi et al.
2022/0289512 A1 9/2022 Takahashi et al.
2022/0334523 A1 10/2022 Akiyama et al.
2024/0242926 A1* 7/2024 Thorne ................... G01N 1/42

* cited by examiner

THICKNESS DETECTION DEVICE, SHEET PROCESSING APPARATUS, AND IMAGE FORMING SYSTEM

CROSS-REFERENCE TO RELATED APPLICATION

This patent application is based on and claims priority pursuant to 35 U.S.C. § 119 (a) to Japanese Patent Application No. 2024-006340, filed on Jan. 18, 2024, in the Japan Patent Office, the entire disclosure of which is hereby incorporated by reference herein.

BACKGROUND

Technical Field

The present disclosure relates to a thickness detection device, a sheet processing apparatus, and an image forming system.

Related Art

A thickness detection device that detects a thickness of an object is known. For example, in a sheet processing apparatus that performs binding processing on a sheet bundle that is a stack of a plurality of sheet media (hereinafter referred to as "sheet"), the thickness detection device is used to detect the thickness of the sheet bundle as an object.

In addition, an image forming apparatus equipped with a processing unit, the processing unit including a function of the sheet processing apparatus provided with the thickness detection device, and an image forming system in which the sheet processing apparatus provided with the thickness detection device and the image forming apparatus work in a coordinated fashion are also known.

As the sheet processing apparatus, an in-body type apparatus has also been proposed that is installable in a housing of the image forming apparatus and receives a sheet inserted from the outside of the housing to perform predetermined processing.

For a sheet processing apparatus that enables a user to perform "offline binding" in which a sheet bundle that is a stack of a plurality of sheets is inserted into a cavity, and binding processing is manually performed, a configuration that eliminates the need to manage a thickness of the inserted sheet bundle to match a binder is disclosed.

SUMMARY

The present disclosure described herein provides a thickness detection device for detecting a thickness of an object. The thickness detection device includes a thickness-direction moving member and a thickness detector. The thickness-direction moving member is held to be movable in a direction of the thickness by the object inserted into a cavity having an opening that opens in a plurality of directions. The thickness detector detects the thickness-direction moving member moved by the object inserted into the cavity to detect the thickness of the object. The thickness-direction moving member has a portion to face the object inserted into the cavity. The portion has a shape inclined relative to an insertion direction of the object.

The present disclosure described herein also provides a sheet processing apparatus that includes a binding processing device, the thickness detection device, and processing circuitry. The binding processing device binds a bundle of sheets as the object. The binding processing device includes a plurality of binders to perform a plurality of different types of binding processing. The thickness detection device detects a thickness of the bundle of sheets. The processing circuitry controls the binding processing device to perform an operation in accordance with the thickness of the bundle of sheets. The processing circuitry selects one binder of the plurality of binders in accordance with the thickness of the bundle of sheets, and causes the one binder to perform binding processing.

The present disclosure described herein further provides an image forming system that includes: an image forming apparatus to form an image on a sheet; and the sheet processing apparatus coupled to the image forming apparatus.

BRIEF DESCRIPTIONS OF THE DRAWINGS

A more complete appreciation of embodiments of the present disclosure and many of the attendant advantages and features thereof can be readily obtained and understood from the following detailed description with reference to the accompanying drawings, wherein.

Figure 1:
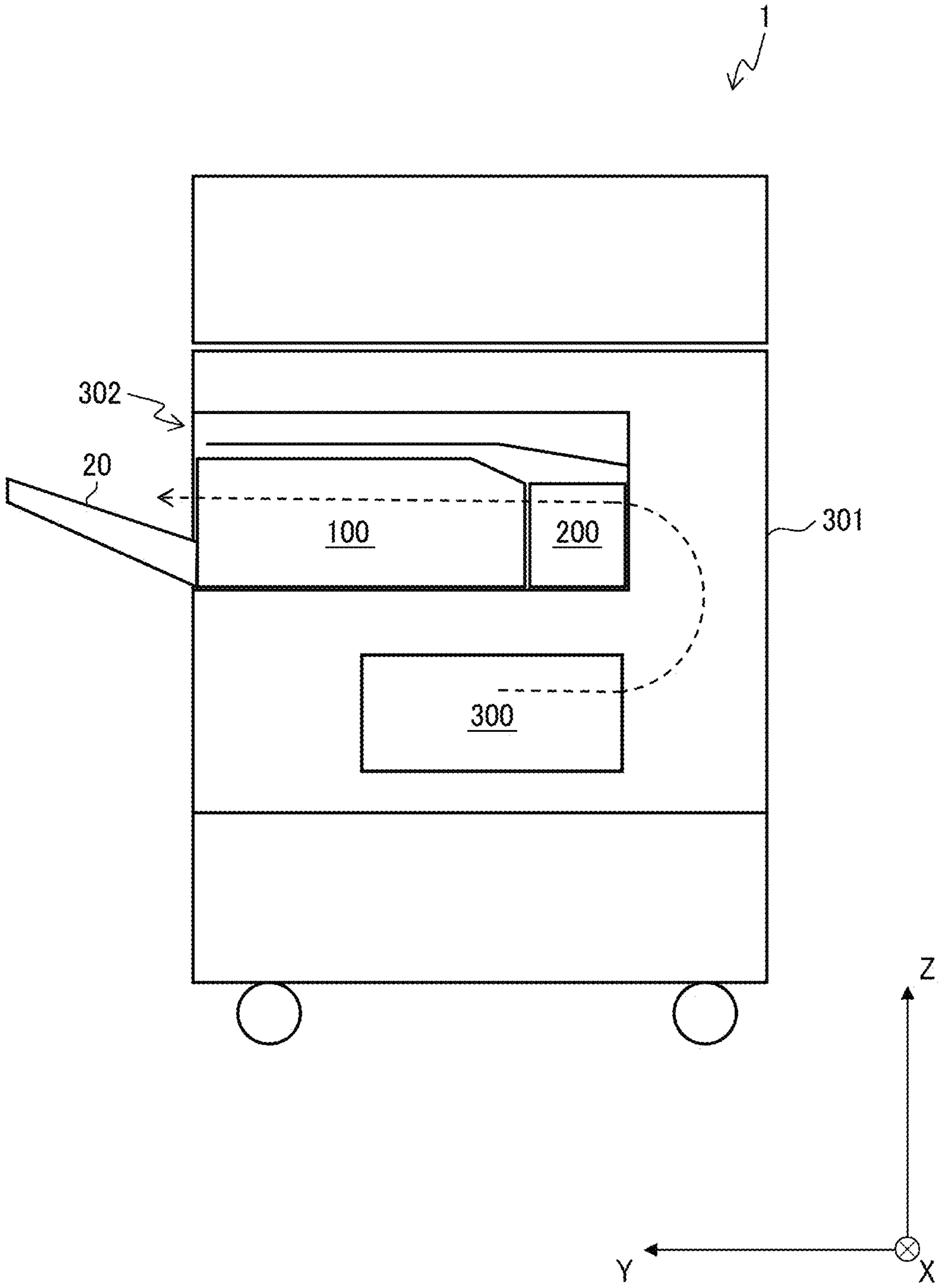
FIG. 1 is an external view of an example of a multifunction peripheral (MFP) as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a thickness detection device, a sheet processing apparatus, and an image forming system according to embodiments of the present disclosure will be described with reference to the drawings. First, a binding processing unit 100 as an embodiment of the sheet processing apparatus and a printer system 1 as an embodiment of the image forming system will be illustrated.

Embodiment of Image Forming System

Figure 2:
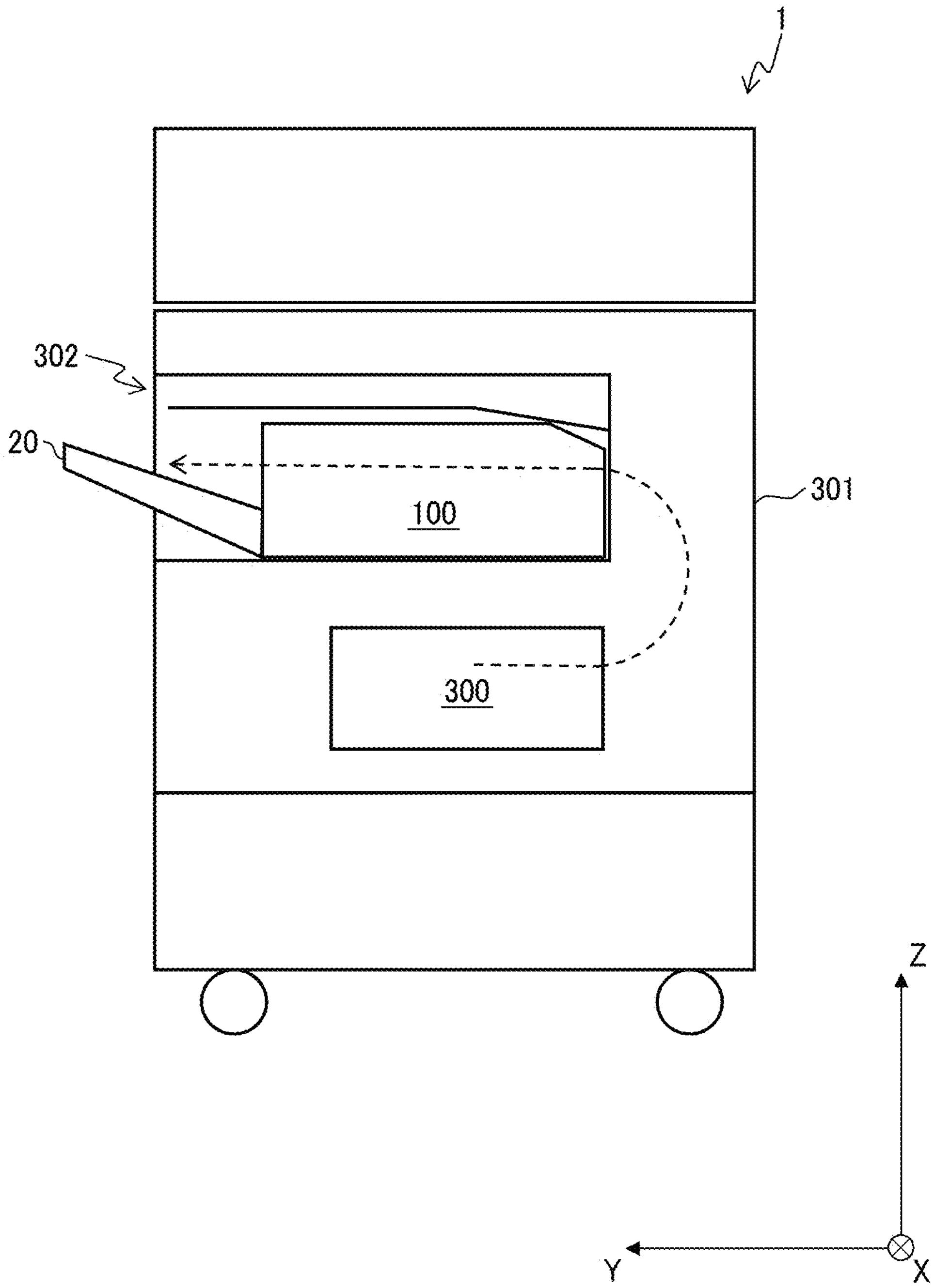
FIG. 2 is an external view of another example of the MFP as the image forming apparatus according to an embodiment of the present disclosure.

First, the printer system 1 will be described with reference to FIGS. 1 to 5. FIGS. 1 and 2 are external views of the printer system 1 according to the present embodiment. The printer system 1 has an image forming function for forming an image on a sheet S (typically, a sheet of paper) as a sheet medium and a post-processing function for performing predetermined sheet processing (post-processing) on the sheet S on which the image is recorded.

As illustrated in FIG. 1, the printer system 1 mainly includes a housing 301 and an image former 300 inside the housing 301, the image former 300 corresponding to an image forming apparatus. The housing 301 is boxy and has an inner space that houses components of the printer system 1. The housing 301 has an internal space 302 accessible from outside the printer system 1. The internal space 302 is a section exposed outward due to partial removal of the outer wall of the housing 301 and is located, for example, slightly higher than the center in the vertical direction of the housing 301.

As optional units for adding optional functions, a punching processing unit 200 and the binding processing unit 100 are installable in the internal space 302. The punching processing unit 200 enables punching processing, and the binding processing unit 100 enables binding processing for binding a plurality of sheets S in a bundle. Not that the binding processing unit 100 corresponds to a sheet processing apparatus according to an embodiment of the present disclosure.

The image former 300 ejects, to the punching processing unit 200 and the binding processing unit 100, a sheet S picked up and conveyed from a sheet holding tray. The image former 300 may be an inkjet system that forms an image using ink or an electrophotographic system that forms an image using toner. Since the image former 300 has an already known configuration, a detailed description thereof is omitted.

The punching processing unit 200 is installed in the internal space 302 of the printer system 1 such that the punching processing unit 200 is located downstream of the image former 300 and upstream of the binding processing unit 100 on a conveyance path for sheets S ranging from the image former 300 to the binding processing unit 100 (on a path indicated with a dashed arrow in FIG. 1). That is, in the example with the printer system 1, a sheet S on which an image is formed by the image former 300 is delivered to the punching processing unit 200 and is then subjected to predetermined punched-hole forming processing. After that, the sheet S is delivered to the binding processing unit 100 and is then subjected to binding processing described later.

Note that the punching processing unit 200 is detachable from the printer system 1. Removal of the punching processing unit 200 results in a state illustrated in FIG. 2. In this case, a sheet S on which an image is formed by the image former 300 is directly delivered to the binding processing unit 100 and is then subjected to binding processing. Note that another processing unit that performs optional processing on the sheet S can be installed in the position in the internal space 302 from which the punching processing unit 200 has been removed.

Figure 3:
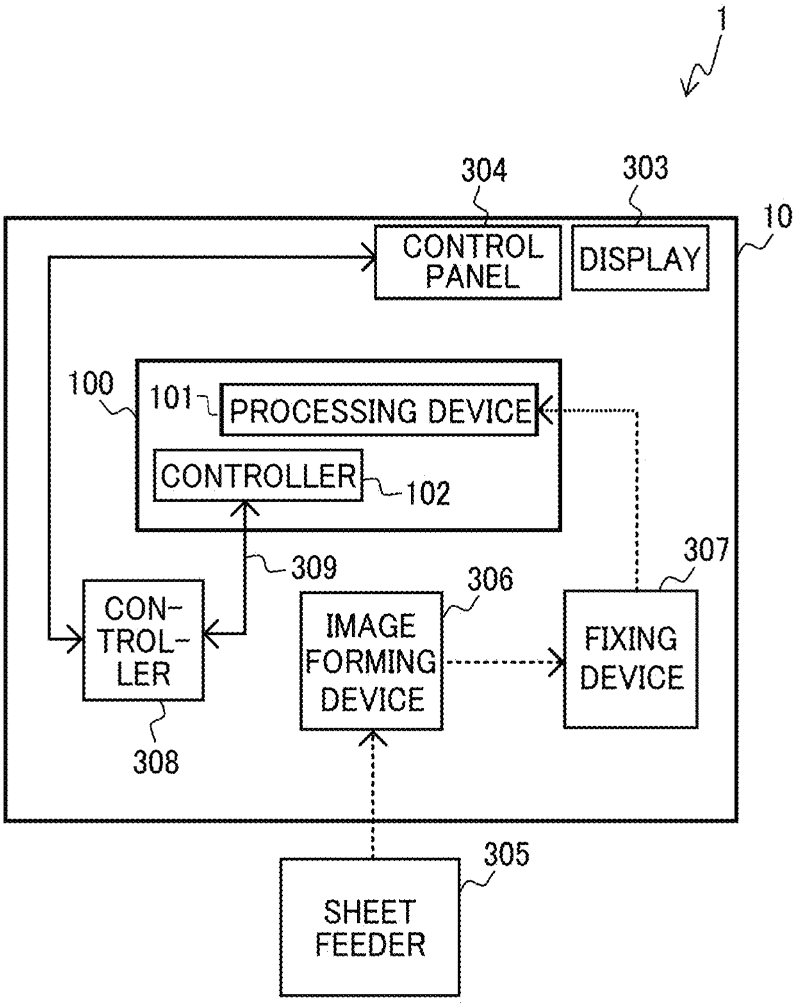
FIG. 3 is a functional block diagram corresponding to the example of the MFP according to the present embodiment.

Control Configuration of Image Forming System Including Binding Processing Unit Next, a control configuration of the printer system 1 including the binding processing unit 100 will be described. FIG. 3 is a diagram illustrating a control configuration of the printer system 1 with the punching processing unit 200 removed.

In FIG. 3, the conveyance path of the sheet S (flow of the sheet S) is indicated by a dashed arrow, and a path (signal flow) of a communication signal (control signal) is indicated by a solid arrow.

The printer system 1 includes a display 303 that notifies the user of a state and operation details of various apparatuses, a control panel 304 serving as a setting device that the user operates to set a mode or the number of copies, and a sheet feeder 305 that stores the sheets S and feeds the sheets S sheet by sheet. The printer system 1 includes an image forming device 306 that forms a latent image on a photoconductor omitted in FIG. 3, and transfers the image to the sheet S, and a fixing device 307 that fixes the image transferred to the sheet S. The printer system 1 further includes an image formation controller 308 that controls the operation of each unit described above.

In the binding processing unit 100 as an embodiment of the sheet processing apparatus, the image formation controller 308 of the printer system 1 issues a processing instruction to a binding processing controller 102 through a communication line 309 to cause a binding processing device 101 to perform specified processing on the specified sheet S.

The image formation controller 308 and the binding processing controller 102 connected through the communication line 309 can exchange information. This enables the exchange of information regarding an operation mode, information regarding the size of sheet S, or information regarding timing, which enables a systematic operation.

Figure 4:
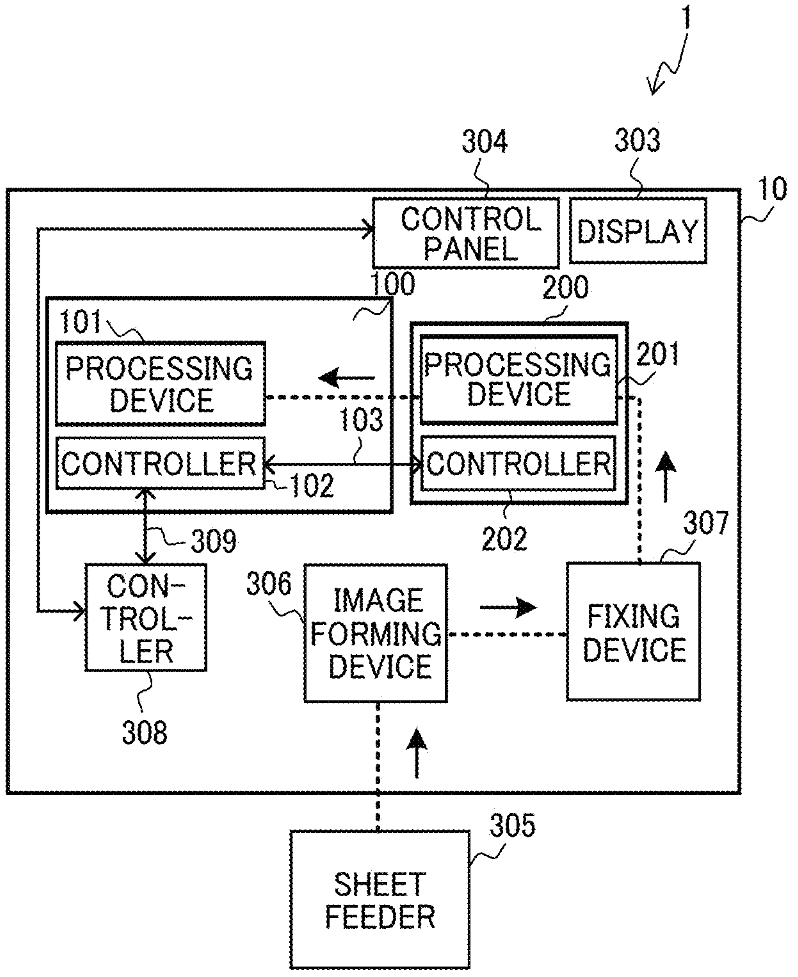
FIG. 4 is a functional block diagram corresponding to another example of the MFP according to the present embodiment.

FIG. 4 illustrates a control configuration example of a printer system 1 having the punching processing unit 200 installed therein. Also in FIG. 4, the conveyance path of the sheet S (flow of the sheet S) is indicated by a dashed arrow, and the path (signal flow) of the communication signal (control signal) is indicated by a solid arrow.

Similarly, the printer system 1 includes the display 303, the control panel 304, and the sheet feeder 305. Similarly, the printer system 1 further includes the image forming device 306 and the image formation controller 308.

In the binding processing unit 100 as an embodiment of the sheet processing apparatus, the image formation controller 308 of the printer system 1 issues a processing instruction to a binding processing controller 102 through a communication line 309 to cause the binding processing device 101 to perform specified processing on the specified sheet S. The binding processing device 101 is notified of specification information regarding details of processing to be performed on the sheet S through a punching processing device 201.

The image formation controller 308 and the binding processing controller 102 connected through the communication line 309 can exchange information. This enables the exchange of information regarding an operation mode, information regarding the size of sheet S, or information regarding timing, which enables a systematic operation.

The punching processing unit 200 includes a punching processing controller 202 that receives an instruction from the binding processing controller 102 through a communication line 103 after the image formation controller 308 of the printer system 1 issues a processing instruction to the binding processing controller 102 through the communication line 309. The punching processing controller 202 controls the punching processing device 201 to perform the specified punching processing.

Hardware Configuration of Binding Processing Unit

Figure 5:
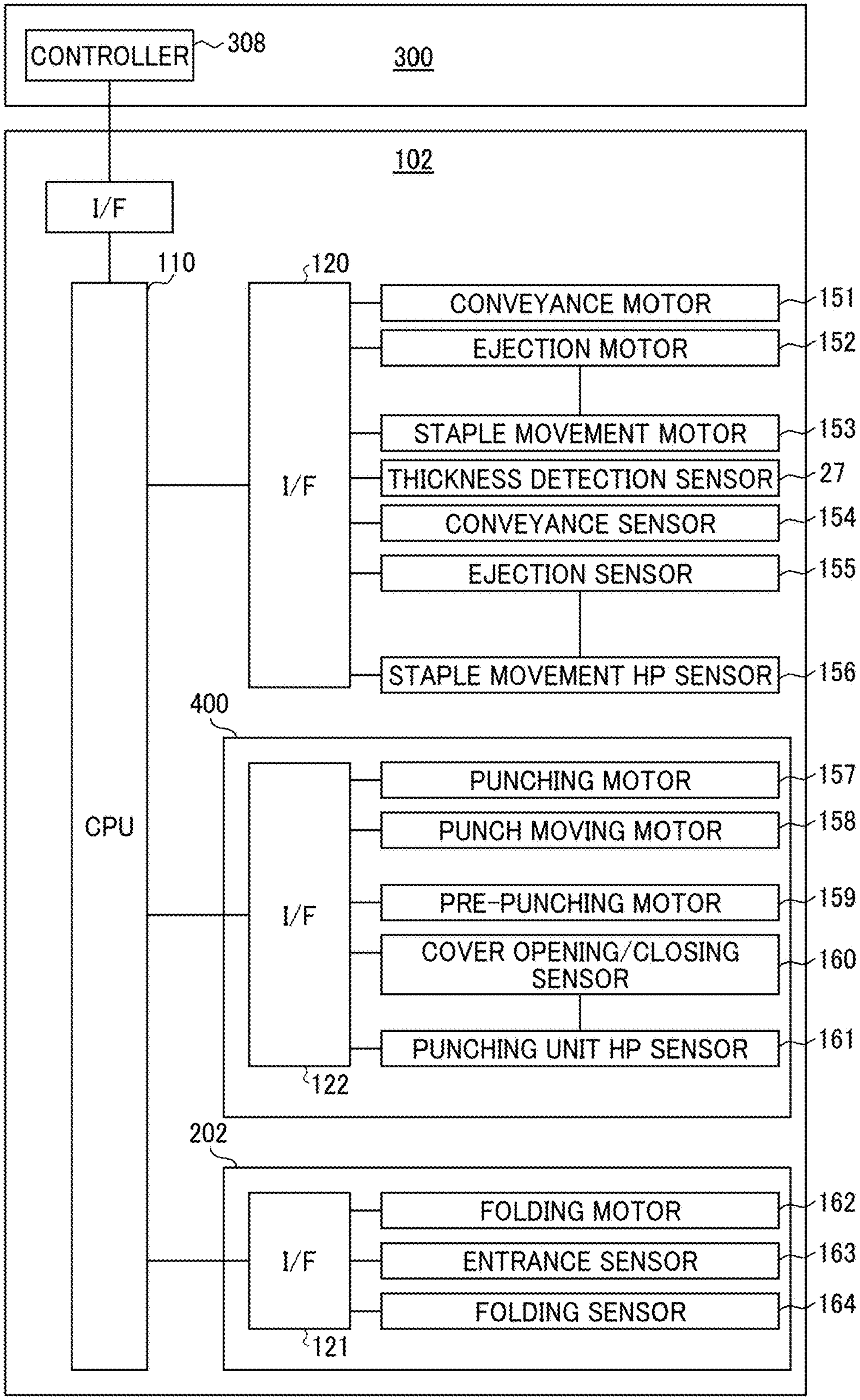
FIG. 5 is a hardware configuration diagram of the above-described embodiment.

Next, a hardware configuration of the binding processing unit 100 included in the printer system 1 will be described with reference to FIG. 5. As illustrated in FIG. 5, the binding processing unit 100 includes a central processing unit (CPU) 110 as a controller or circuitry in the binding processing controller 102, and is connected to a plurality of motors serving as power sources for operation of each mechanism and a plurality of sensors via an interface (I/F) 120. The CPU 110 serves as an arithmetic unit and controls the overall operation of the binding processing unit 100.

The CPU 110 in the binding processing unit 100 is connected to the image formation controller 308 of the printer system 1 via the I/F 120, and controls the binding processing unit 100 in accordance with a processing signal from the printer system 1. The binding processing unit 100 is an optional apparatus and thus has a detachable hardware configuration. An I/F for connection between the image former 300 and the binding processing unit 100 includes, for example, a relay connector or a drawer connector that enables a detachable hardware configuration.

A drive motor that drives a plurality of conveyance roller pairs for performing the binding processing in the binding processing unit 100 is equipped with an encoder enabling detection of an amount of driving of each motor based on the number of pulses. The conveyance roller pair can be driven to or stopped at a position corresponding to a specific amount of driving with a specific timing as a base point, which enables control of conveying the sheet S by a predetermined amount in a predetermined direction.

The amount of driving of each motor can be calculated on the basis of the pulses of the corresponding encoder measured with the timing at which a sensor on the conveyance path is turned ON or OFF as a base point. A position of an end of the sheet S being conveyed can be determined on the basis of the calculated amount of driving.

As illustrated in FIG. 5, in the binding processing controller 102, which is a controller of the binding processing unit 100, a conveyance motor 151, an ejection motor 152, a staple movement motor 153, a conveyance sensor 154, a thickness detection sensor 27, an ejection sensor 155, and a staple movement HP sensor 156 are connected to the CPU 110 via the I/F 120.

In the punching processing controller 202, which is a controller of the punching processing unit 200, a folding motor 162, an entrance sensor 163, and a folding sensor 164 are connected to the CPU 110 via the I/F 121.

When a punching processing unit that performs punching processing on the sheet S is optionally coupled, in a controller of the punching processing unit, a punching motor 157, a punch moving motor 158, a pre-punching motor 159, a cover opening/closing sensor 160, and a punching unit HP sensor 161 are connected to the CPU 110 via the I/F 122.

The thickness detection sensor 27 is a sensor that detects whether or not a thickness-direction moving member to be described later has moved to a predetermined position. The CPU 110 is notified of the detection result of the thickness detection sensor 27, and detects the thickness of the sheet bundle Sb as an object on the basis of the notification. That is, the thickness detector is implemented by the thickness detection sensor 27, the CPU 110, and a thickness detection control program executed using arithmetic processing functions of the CPU 110, according to the present embodiment.

First Embodiment of Thickness Detection Device

Figure 6A:
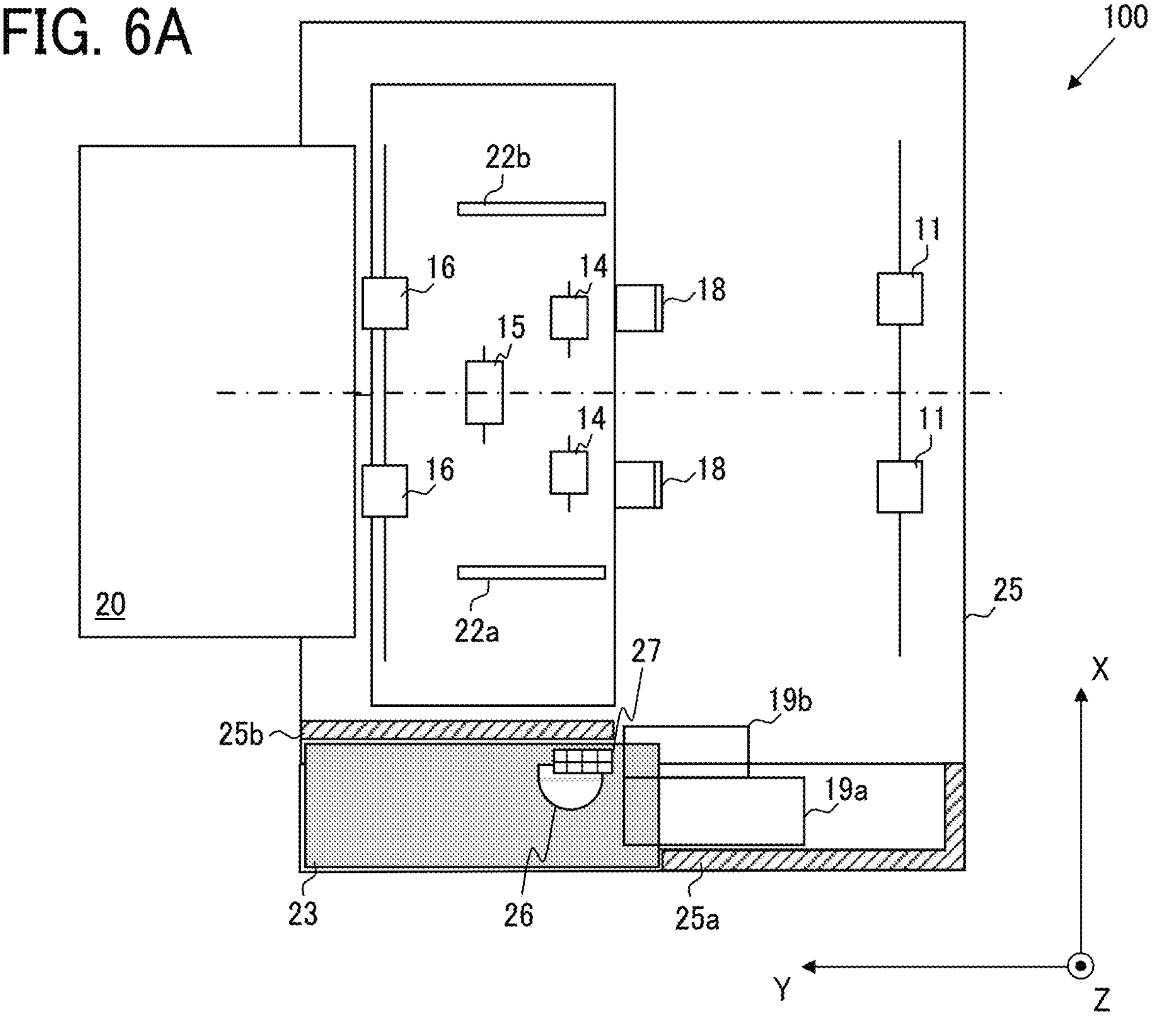
FIGS. 6A and 6B are schematic configuration diagrams illustrating a basis configuration of a binding processing unit according to the present embodiment.
Figure 6B:
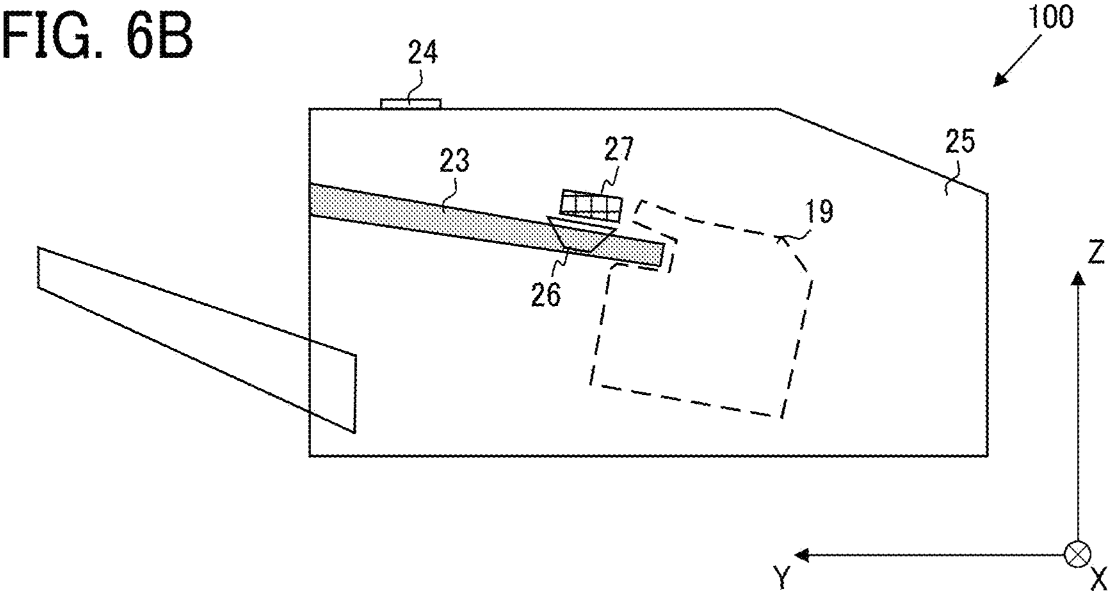

Next, a sheet processing apparatus including a thickness detection device according to an embodiment of the present disclosure will be described with reference to the drawings. FIGS. 6A and 6B are diagrams illustrating a configuration of the binding processing unit 100 as an embodiment of the sheet processing apparatus. FIG. 6A is a plan view of the binding processing unit 100, illustrating a section where sheets S are stacked to form a sheet bundle Sb. FIG. 6B is a cross-sectional view of the binding processing unit 100. The binding processing unit 100 as a binding processing device includes a plurality of binders 19 for various types of binding, the plurality of binders 19 each serving as a processing device that performs binding processing of bundling and binding the sheet bundle Sb.

Each binder 19 includes, for example, a staple binder 19*a* that can perform "staple binding" of binding an end of the sheet bundle Sb using binding staples. Further included is a crimp binder 19*b* that can perform "crimp binding" of applying pressure to deform a part of the sheet bundle Sb to bind the sheet bundle Sb, instead of using binding staples. In the following description, regardless of the type of the binding processing, the term of "binder 19" will be used. When each binding type is referred to, the binding type is denoted by the corresponding reference numeral.

The binding processing unit 100 has a configuration enabling manual binding (offline binding). An enabled binding type of the manual binding is limited to neither "staple binding" nor "crimp binding", and for example, any method can be selected in accordance with a user's preference setting.

That is, the binding processing unit 100 illustrated below is applicable to a binding processing unit including the staple binder 19*a*, a binding processing unit including the crimp binder 19*b*, or a binding processing unit having a hybrid configuration including both the staple binder 19*a* and the crimp binder 19*b*.

As illustrated in FIGS. 6A and 6B, a slit 23 serving as a sheet insertion section used by the user to insert the sheet bundle Sb as an object for manual binding is provided in an outer cover 25 (a part of the housing) of the housing that houses the components of the binding processing unit 100. The slit 23 has an opening provided in a part of the outer cover 25. The opening of the slit 23 is provided in a plurality of directions, and is formed so as to allow the sheet bundle Sb to be inserted from a plurality of directions. That is, the slit 23 is provided with ports in a plurality of directions, the ports being used when the user inserts the sheet bundle Sb as an object. The slit 23 corresponds to a cavity having openings in a plurality of directions.

The slit 23 corresponds to a section including an opening and a space forming a cavity communicating with the opening. The slit 23 corresponds to a sheet bundle receiving space having a structure into which the sheet bundle Sb can be inserted toward a binding processing execution position. The binding processing execution position corresponds to a position where, in order to perform the binding processing on the sheet bundle Sb inserted from the outside of the apparatus housing (the outside of the outer cover 25), the sheet bundle Sb is fully inserted.

That is, the slit 23 is formed with a depth at which the binding position (end) of the binding target sheet bundle Sb reaches the binding processing execution position.

Figure 7A:
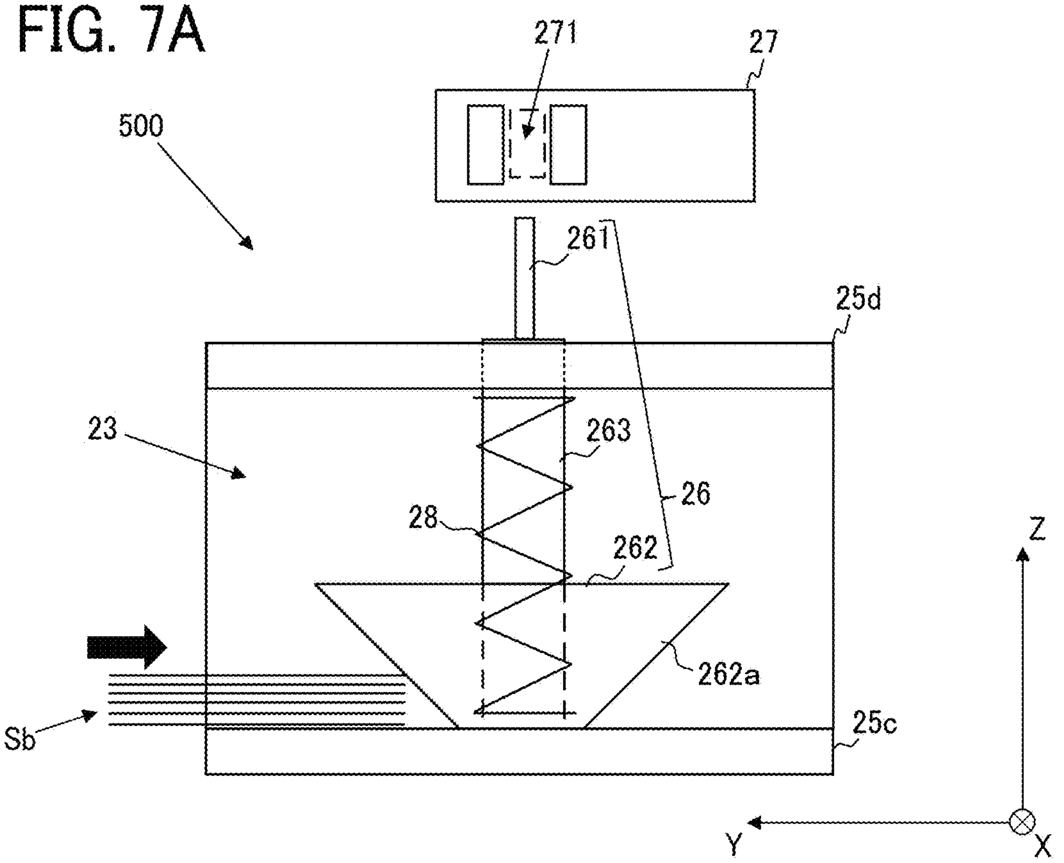
FIGS. 7A and 7B are configuration diagrams illustrating an example of a configuration of a thickness detection unit according to the present embodiment.
Figure 7B:
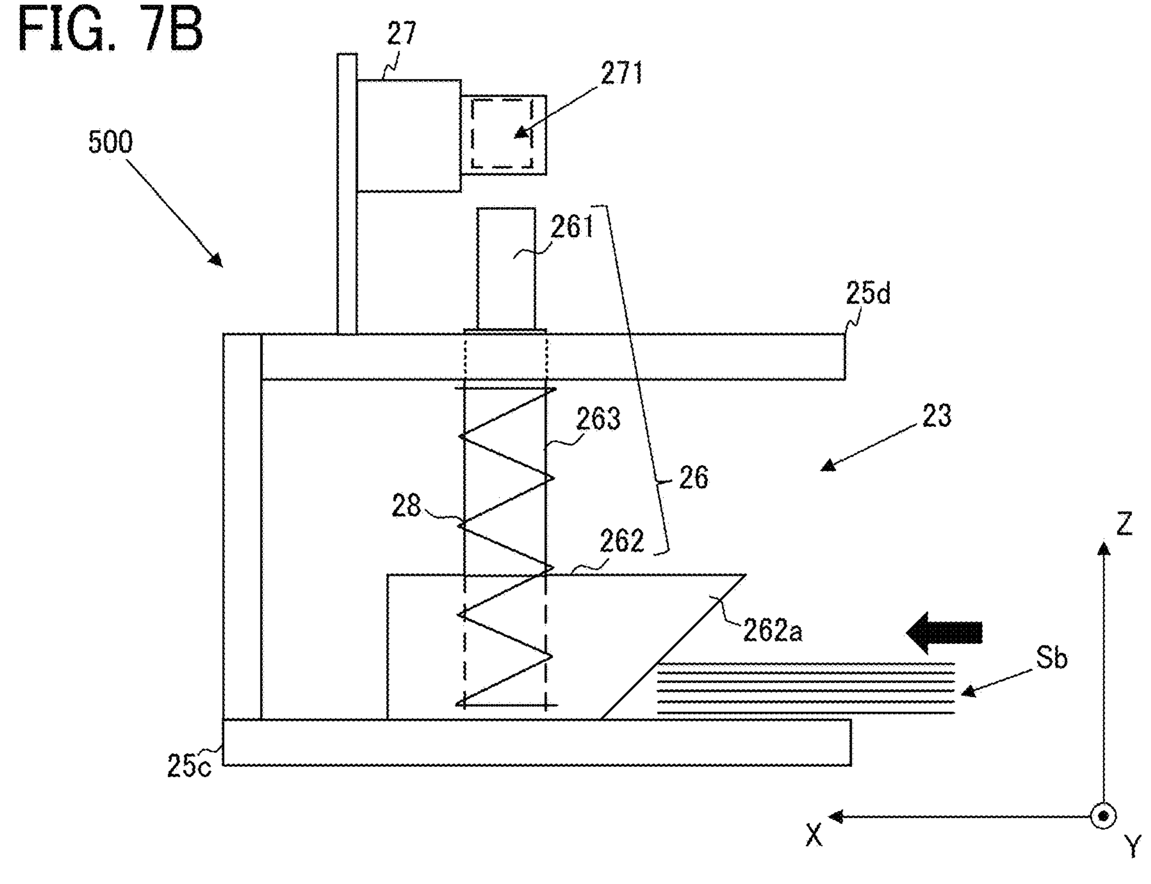
Figure 8A:
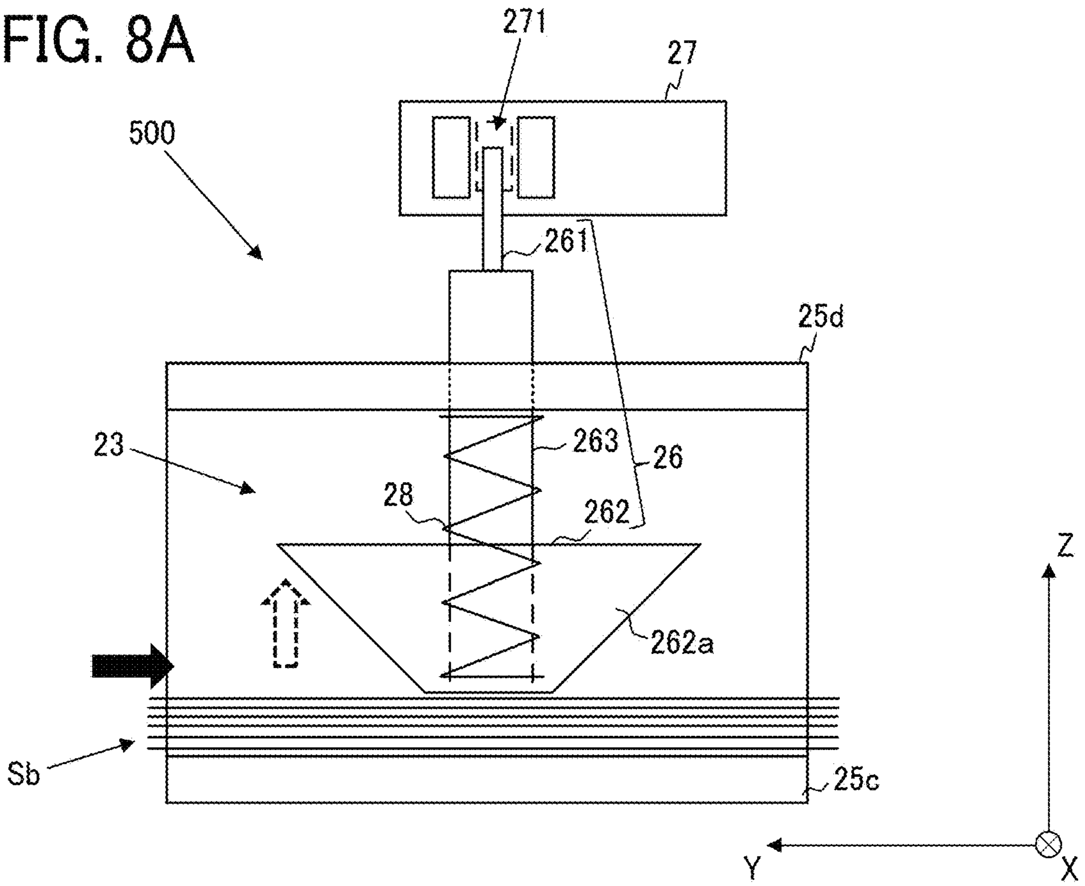
FIGS. 8A and 8B are configuration diagrams illustrating the example of the configuration of the thickness detection unit according to the present embodiment.
Figure 8B:
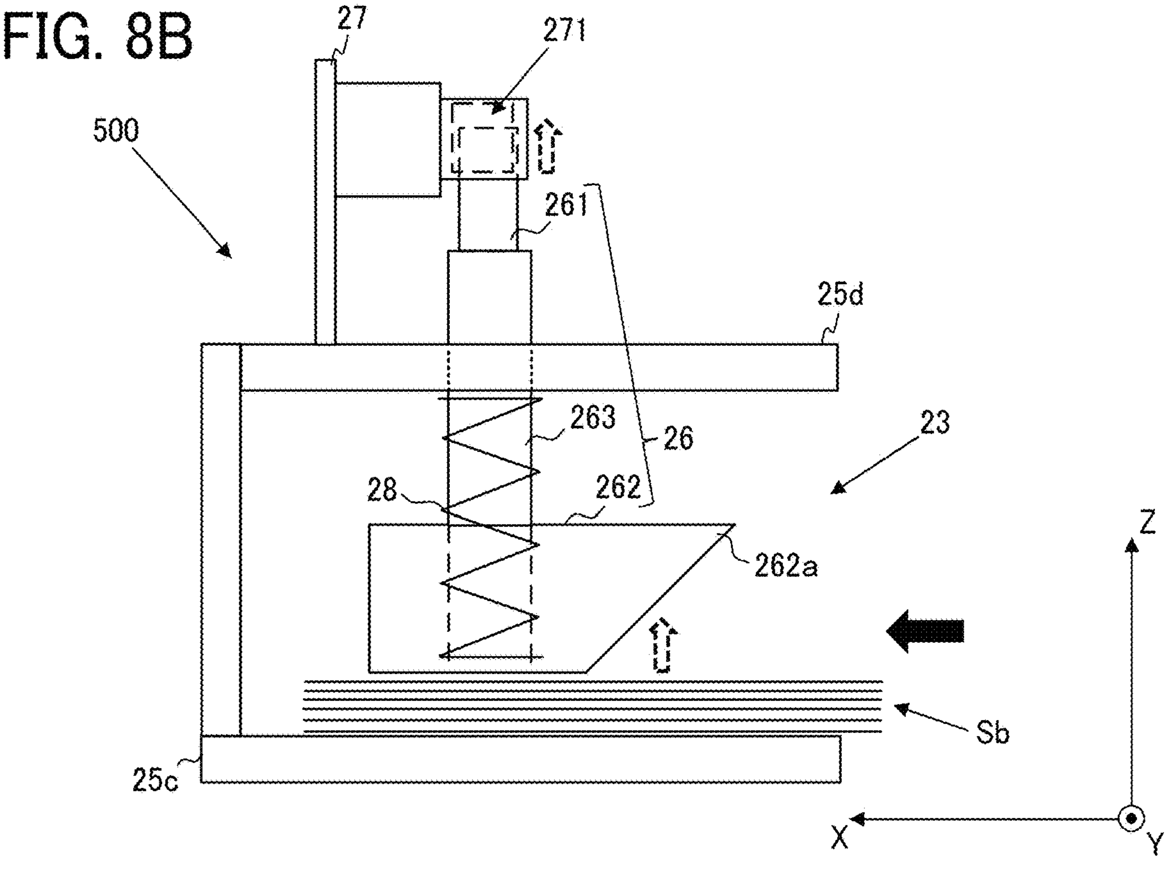

Next, a thickness detection unit 500 as an embodiment of the thickness detection device that detects the thickness of the object (sheet bundle Sb) inserted into the slit 23 will be described with reference to FIGS. 7A, 7B, 8A, and 8B. FIGS. 7A and 7B illustrate a state before the sheet bundle Sb is inserted into the thickness detection unit 500, and the thickness of the sheet bundle Sb is detected. FIGS. 8A and 8B illustrate a state where the sheet bundle Sb is inserted into the thickness detection unit 500, and the thickness of the sheet bundle Sb is detected.

FIG. 7A is a diagram illustrating the thickness detection unit 500 as viewed from the width direction (X direction). FIG. 7B is a diagram illustrating the thickness detection unit 500 as viewed from the ejection direction (Y direction) of the sheet S. The same applies to FIGS. 8A and 8B.

As illustrated in FIGS. 7A, 7B, 8A, and 8B, a detection member 26 is installed in the slit 23. The detection member 26 is installed at, for example, a deep portion of the cavity of the slit 23. The detection member 26 corresponds to a thickness-direction moving member held to move in the thickness direction of the object, and has a portion facing the sheet bundle Sb inserted into the slit 23. That is, the detection member 26 is held to move in the thickness direction of the sheet bundle Sb by being further pushed toward the deep portion of the slit 23 with the sheet bundle Sb in contact with the portion facing the sheet bundle Sb.

The detection member 26 illustrated in FIGS. 7A, 7B, 8A, and 8B moves from bottom to top. How the detection member 26 is held and moved is not limited the above. For example, the detection member 26 may be held on a slit bottom surface 25*c*, and the detection member 26 may be pushed down by inserting the sheet bundle Sb into an upper space of the slit 23. That is, regarding the installation position of the detection member 26 and how the detection member 26 is held, the moving direction of the detection member 26 is not particularly limited as long as the detection member 26 is movable when being pushed by coming into contact with the sheet bundle Sb inserted into the slit 23.

The sheet bundle Sb can be inserted into the slit 23 from a plurality of directions. For example, as illustrated in FIGS. 7A and 8A, the sheet bundle Sb may be inserted from the left side (Y-direction side) of the binding processing unit 100. Furthermore, as illustrated in FIGS. 7B and 8B, the sheet bundle Sb may be inserted from the front side (X-direction side) of the binding processing unit 100.

The thickness detection sensor 27 is a sensor that detects whether or not an object to be detected is present in a detection area 271. Here, the object to be detected is a part of the detection member 26. For example, the thickness detection sensor 27 is installed above the detection member 26. When the detection member 26 is moved upward by the sheet bundle Sb inserted into the slit 23, the thickness detection sensor 27 detects whether or not a detection portion 261 provided at an end in the moving direction of the detection member 26 has entered the detection area 271. The binding processing controller 102 is notified that the detection portion 261 has entered the detection area 271.

As illustrated in FIGS. 7A, 7B, 8A, and 8B, the detection member 26 is biased by a biasing member 28. The biasing member 28 is, for example, a spring, and may be a leaf spring, a torsion spring, or a compression spring. A direction of force applied by the biasing member 28 is a direction opposite to the direction in which the detection member 26 moves by coming into contact with the sheet bundle Sb as an object for thickness detection. In the present embodiment, the direction of force applied by the biasing member 28 is a direction toward the bottom surface (slit bottom surface 25*c*) of the portion constituting the slit 23.

The detection member 26 waits for insertion of the sheet bundle Sb with the detection member 26 pressed against the slit bottom surface 25*c*. In such a waiting state, the sheet bundle Sb is held so as not to form a gap between the slit 23 and a surface of the sheet bundle Sb that is in contact with the slit 23.

The detection member 26 includes at least the detection portion 261, an object contact portion 262, and a detection member holding portion 263. The object contact portion 262 corresponds to a portion that comes into contact with the object for thickness detection (object) inserted into the slit 23. The detection portion 261 is an integral portion of the object contact portion 262 and moves in the same direction as the moving direction of the object contact portion 262. As illustrated in FIGS. 7A, 7B, and the like, the detection portion 261 is located outside the slit 23, and when the detection portion 261 enters the detection area 271 of the thickness detection sensor 27, the thickness of the sheet bundle Sb can be detected. The detection member holding portion 263 holds the object contact portion 262 so as to allow the detection member 26 to move relative to the slit 23.

The thickness detection sensor 27 is a transmissive sensor disposed in the moving direction of the detection portion 261 (a portion of the detection member 26 extending through a slit top surface 25*d*). The thickness detection sensor 27 includes a light-emitting portion and a light-receiving portion, and the detection area 271 is set between the light-emitting unit and the light-receiving unit. When the detection member 26 is moved by the sheet bundle Sb to cause the detection portion 261 to move to the detection area 271 and enter between the light-emitting unit and the light-receiving unit, light from the light-emitting unit is blocked. At this time, a detection signal output from the thickness detection sensor 27 is provided to the binding processing controller 102, thereby detecting that the detection portion 261 has moved a predetermined amount. Accordingly, the binding processing controller 102 detects the thickness of the sheet bundle Sb. The binding processing controller 102 controls subsequent processing in accordance with the detected thickness of the sheet bundle Sb. Details of the subsequent processing will be described later.

It is possible to set a thickness range that can be detected by adjusting a relative positional relationship between the detection portion 261 not moved by the sheet bundle Sb and the detection area 271 of the thickness detection sensor 27. For example, with a slight gap provided between an upper end of the detection portion 261 and a lower end of the detection area 271, even if the sheet bundle Sb inserted into the slit 23 is thin, the thickness of the sheet bundle Sb can be detected. The detection signal from the thickness detection sensor 27 may be determined by the image formation controller 308.

A configuration may be employed where the thickness detection sensor 27 is installed at each of a plurality of positions having different distances from the detection portion 261, and the thickness of the sheet bundle Sb is detected more precisely by determining the thickness detection sensor 27 that has provided the detection signal.

In a case where the sheet bundle Sb is inserted into the slit 23 as illustrated in FIGS. 7A and 7B, the sheet bundle Sb comes into contact with the object contact portion 262 corresponding to a side surface of the detection member 26. When the sheet bundle Sb is pushed deep in the slit 23, the sheet bundle Sb is pressed against the object contact portion 262, and the detection member 26 is moved upward by the sheet bundle Sb as illustrated in FIGS. 8A and 8B.

The object contact portion 262 that is a side surface of the detection member 26 and comes into contact with the sheet bundle Sb has a facing surface 262*a*. The facing surface 262*a* corresponds to a portion that faces the insertion direction of the sheet bundle Sb and comes into contact with the inserted sheet bundle Sb. The facing surface 262*a* has a shape inclined relative to a direction orthogonal to the insertion direction of the sheet bundle Sb. This makes, with the sheet bundle Sb in contact with the facing surface 262*a* of the object contact portion 262 and further pushed, the sheet bundle Sb easy to push further along the facing surface 262*a*. That is, the object contact portion 262 makes the detection member 26 easy to move by the sheet bundle Sb. Since the object contact portion 262 is inclined, resistance at the time of contact is reduced, and thus, even in a mode where the thickness is detected by contact, damage to the sheet bundle Sb is also reduced.

The facing surface 262*a* of the object contact portion 262 of the detection member 26 may be a linear inclined surface or a curved surface. The inclination angle of the facing surface 262*a* may be set less than or equal to 45 degrees relative to an angle at which the sheet bundle Sb is inserted (insertion angle).

Second Embodiment

Figure 9A:
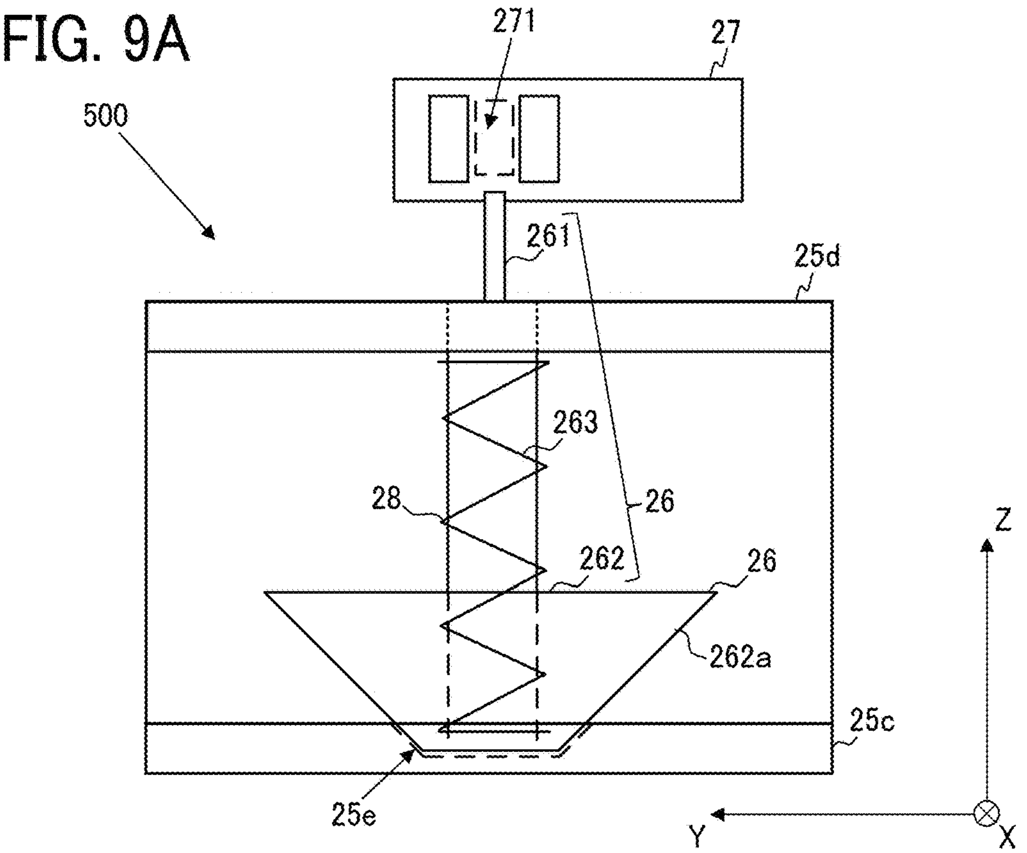
FIGS. 9A and 9B are configuration diagrams illustrating another example of the configuration of the thickness detection unit according to the present embodiment.
Figure 9B:
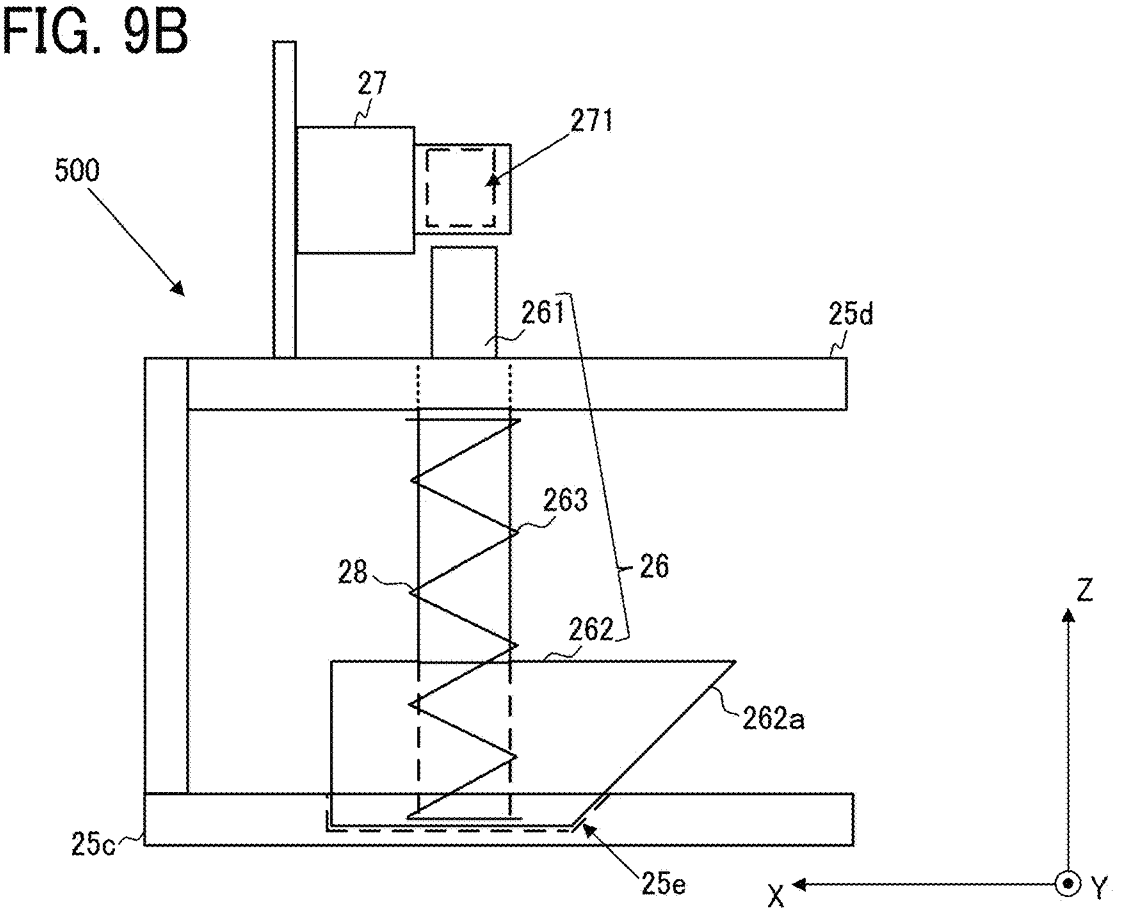
Figure 10A:
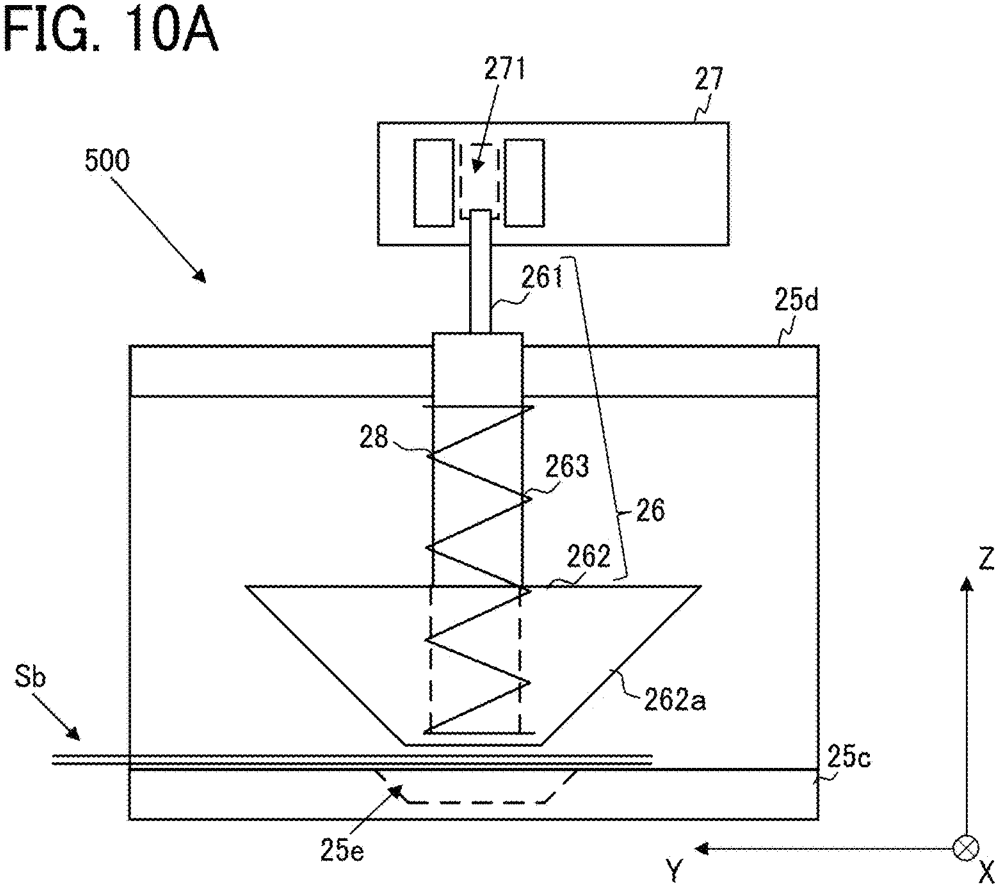
FIGS. 10A and 10B are configuration diagrams illustrating another example of the configuration of the thickness detection unit according to the present embodiment.
Figure 10B:
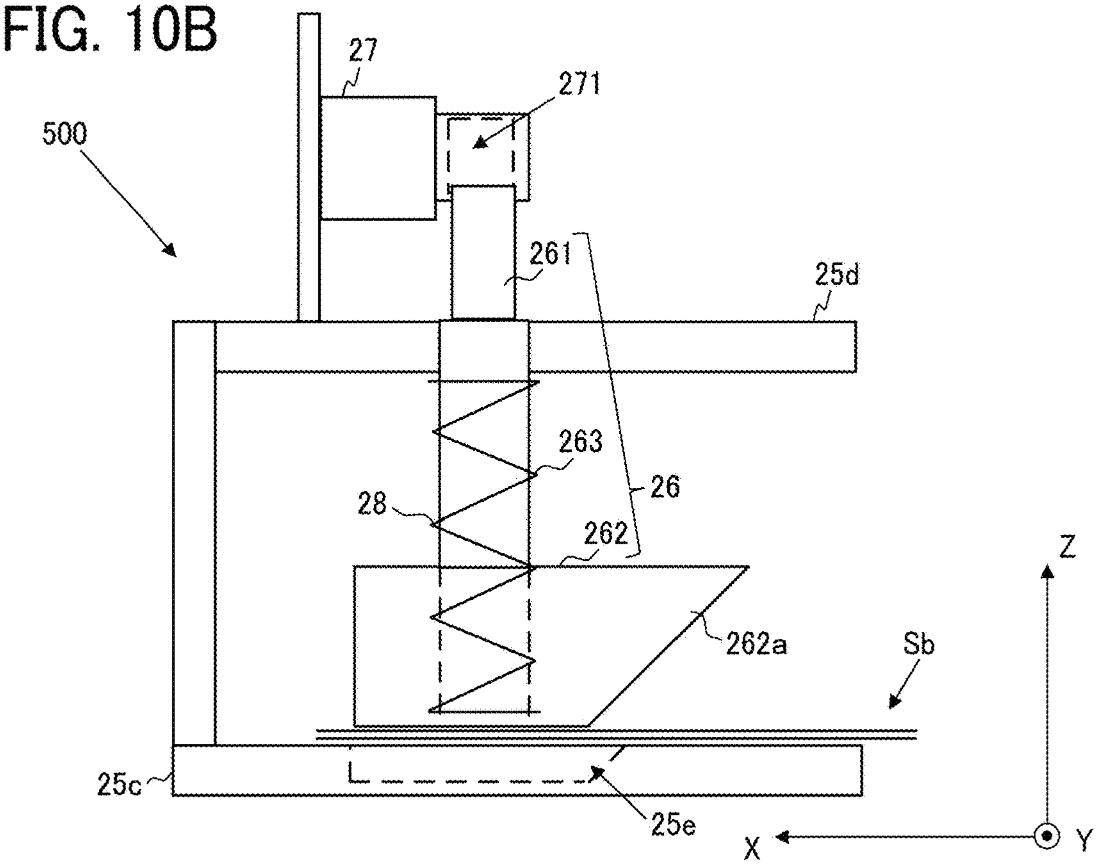

Next, a second embodiment of the thickness detection unit 500 will be described. Hereinafter, a main configuration for detecting the thickness of the sheet bundle Sb inserted from the sheet insertion section when the manual binding according to the present embodiment is performed will be described. FIGS. 9A and 9B illustrate a state of the detection member 26 when the sheet bundle Sb is not inserted into the slit 23. FIGS. 10A and 10B illustrate a state of the detection member 26 after the sheet bundle Sb is inserted into the slit 23. A difference from the first embodiment lies in the position of the detection member 26 when the sheet bundle Sb is not inserted into the slit 23. Hereinafter, differences from the first embodiment will be mainly described, and descriptions of the same configurations will be omitted.

The thickness detection unit 500 according to the present embodiment is largely different from the first embodiment in that the bottom surface (slit bottom surface 25*c*) constituting a part of the slit 23 has a bottom surface recess 25*e* as a depression. The installation position of the thickness detection sensor 27 with the bottom surface recess 25*e* taken into consideration is also different from the first embodiment.

As illustrated in FIGS. 9A and 9B, the bottom surface recess 25*e* is formed at a position where the object contact portion 262 comes into contact with the slit bottom surface 25*c*. The bottom surface recess 25*e* is formed to be wider than the portion where the object contact portion 262 of the detection member 26 comes into contact with the slit bottom surface 25*c*, and is formed such that an end of the object contact portion 262 when the object contact portion 262 is not moved upward by the sheet bundle Sb is located below the slit bottom surface 25*c*.

That is, when the object contact portion 262 of the detection member 26 is not moved by the sheet bundle Sb, the object contact portion 262 can move to a position lower than other places (for example, the slit bottom surface 25*c*) due to the effect of the bottom surface recess 25*e*. In other words, the depression is provided in a part of a boundary surface constituting the slit 23, and when the object for thickness detection is not inserted into the slit 23, the detection member 26 is partially located in the depression of the slit 23 due to the effect of the depression.

The bottom surface recess 25*e* is preferably formed with a depth greater than a distance obtained by adding an inter-individual error in the detection range of the thickness detection sensor 27 and a variation in the distance between the detection member 26 and the thickness detection sensor 27 at the time of assembly. This is to prevent a state where a thin sheet bundle Sb is inserted into the slit 23, and although the detection member 26 is moved upward by the sheet bundle Sb, the detection portion 261 does not reach the detection area 271. That is, the bottom surface recess 25*e* of the slit 23 prevents erroneous detection of the thickness of the sheet bundle Sb in the thickness detection structure including the thickness detection sensor 27 and the detection member 26. Therefore, the depth dimension of the bottom surface recess 25*e* is preferably, for example, 3 mm or more.

As illustrated in FIGS. 10A and 10B, when the sheet bundle Sb is inserted into the slit 23, the detection member 26 moves upward by the depth of the bottom surface recess 25*e* in addition to the thickness of the inserted sheet bundle Sb. Therefore, the detection member 26 moves more than the thickness of the inserted sheet bundle Sb.

When the position of the detection area 271 is set in accordance with the movement range of the detection member 26, the detection portion 261 can reliably move toward the detection area 271 particularly even when the sheet bundle Sb is thin. With this configuration, even when the thin sheet bundle Sb is inserted, the detection member 26 can move to a position where the thickness detection sensor 27 can detect, so that erroneous detection can be prevented.

Third Embodiment

Figure 11A:
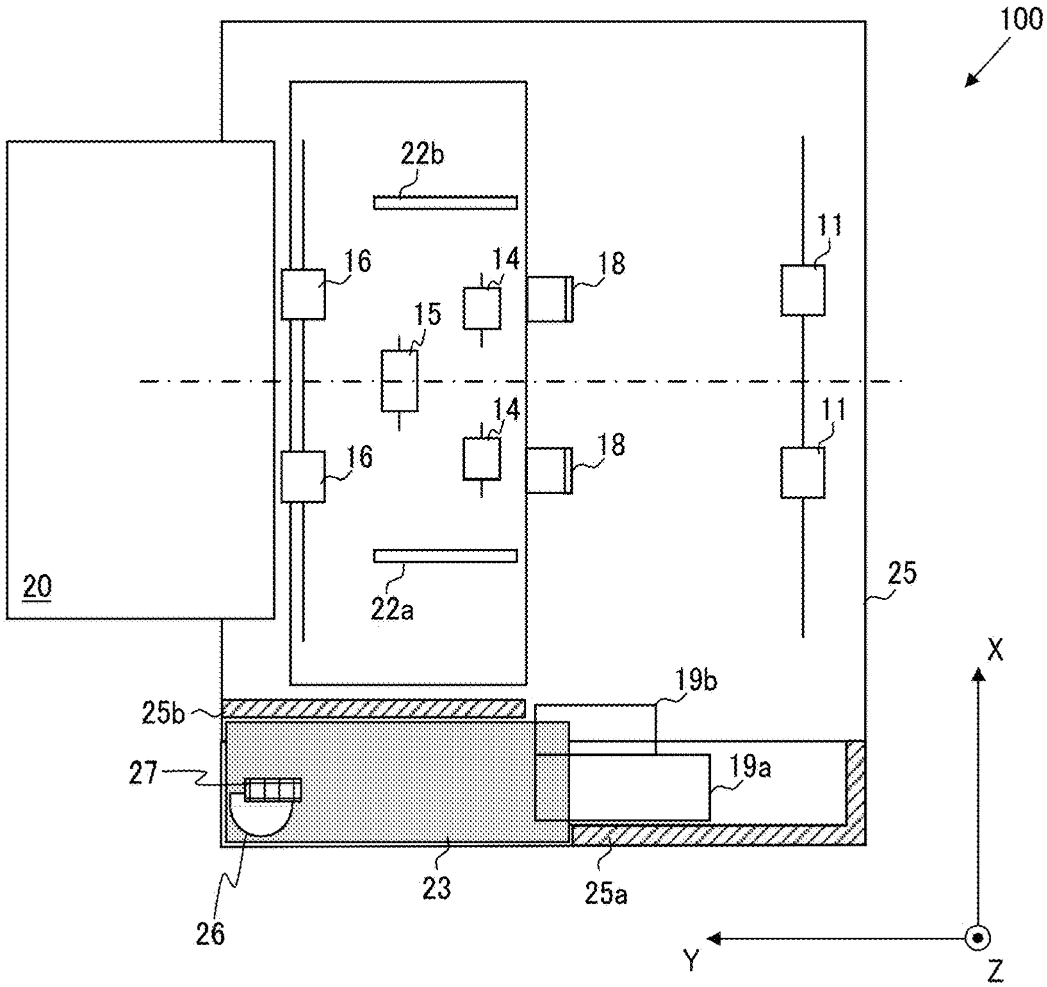
FIGS. 11A and 11B are configuration diagrams illustrating another example of the configuration of the binding processing unit according to the present embodiment.
Figure 11B:
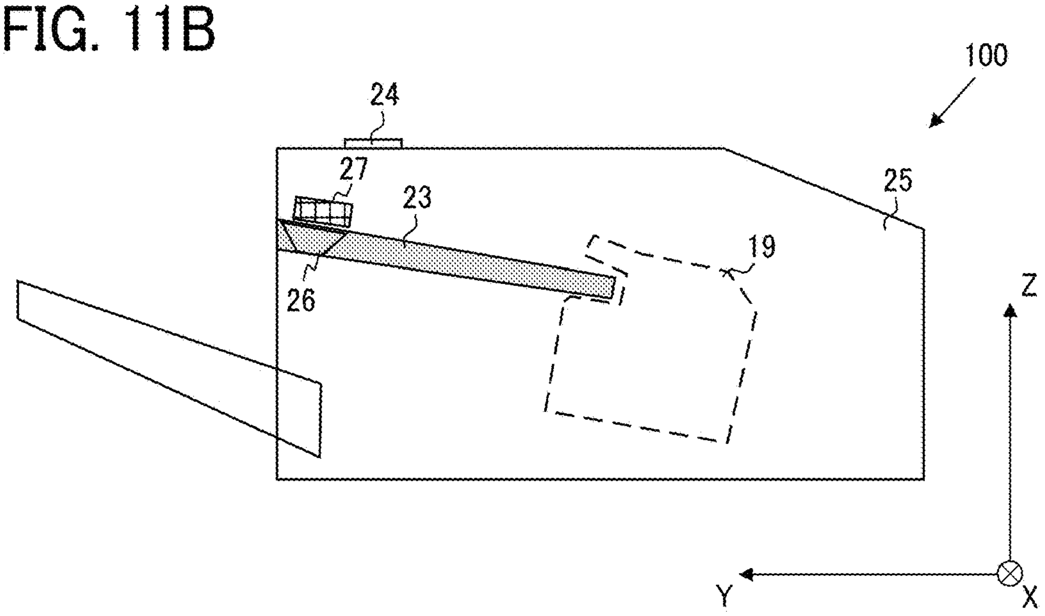

Next, a third embodiment of the thickness detection unit 500 will be described. FIG. 11A is a plan view of the thickness detection unit 500 according to the present embodiment. FIG. 11B is a cross-sectional view of the thickness detection unit 500 according to the present embodiment.

In the thickness detection unit 500 according to the present embodiment, the detection member 26 is disposed near the outer edge of the opening of the slit 23 and in the vicinity of an end of the slit 23. With this configuration, when the sheet bundle Sb is inserted into the slit 23, the detection member 26 starts to move earlier, so that the waiting time until the detection signal is output from the thickness detection sensor 27 can be reduced. Therefore, the thickness of the sheet bundle Sb can be measured before the sheet bundle Sb inserted into the slit 23 is moved to the binding position, and the standby time for pre-processing for starting the binding processing can be reduced.

Fourth Embodiment

Figure 12A:
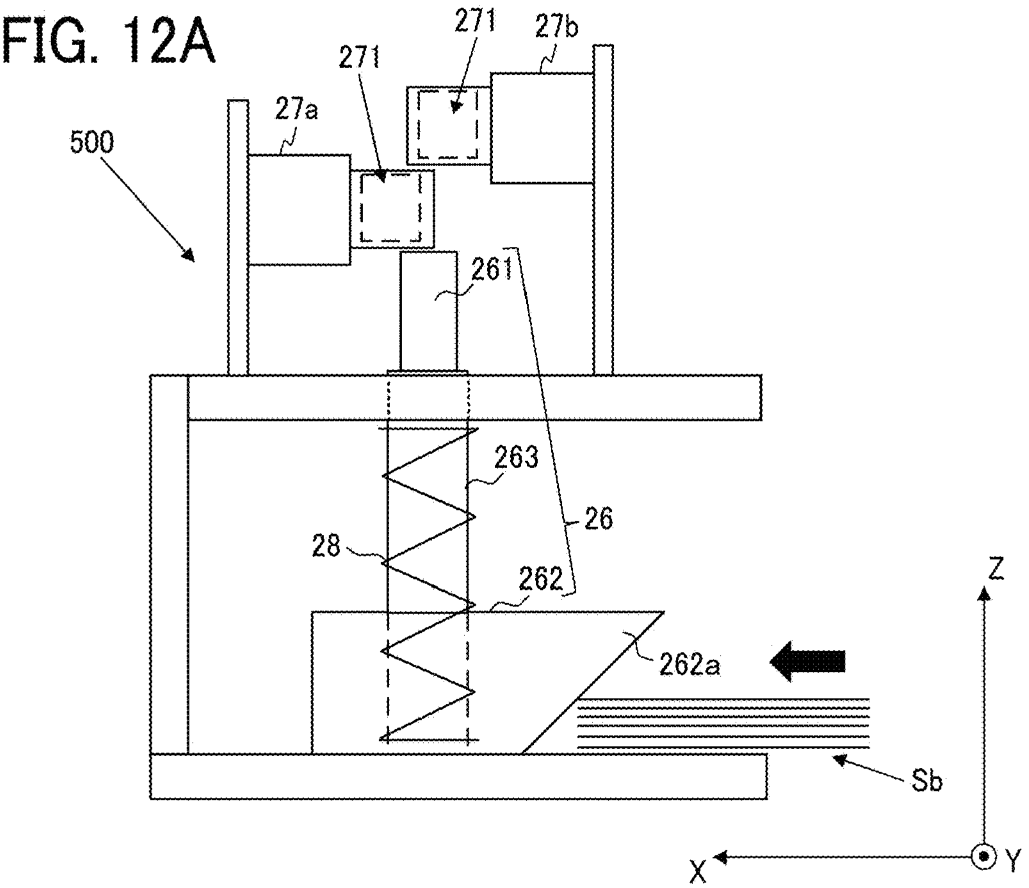
FIGS. 12A and 12B are configuration diagrams illustrating still another example of the configuration of the thickness detection unit according to the present embodiment.
Figure 12B:
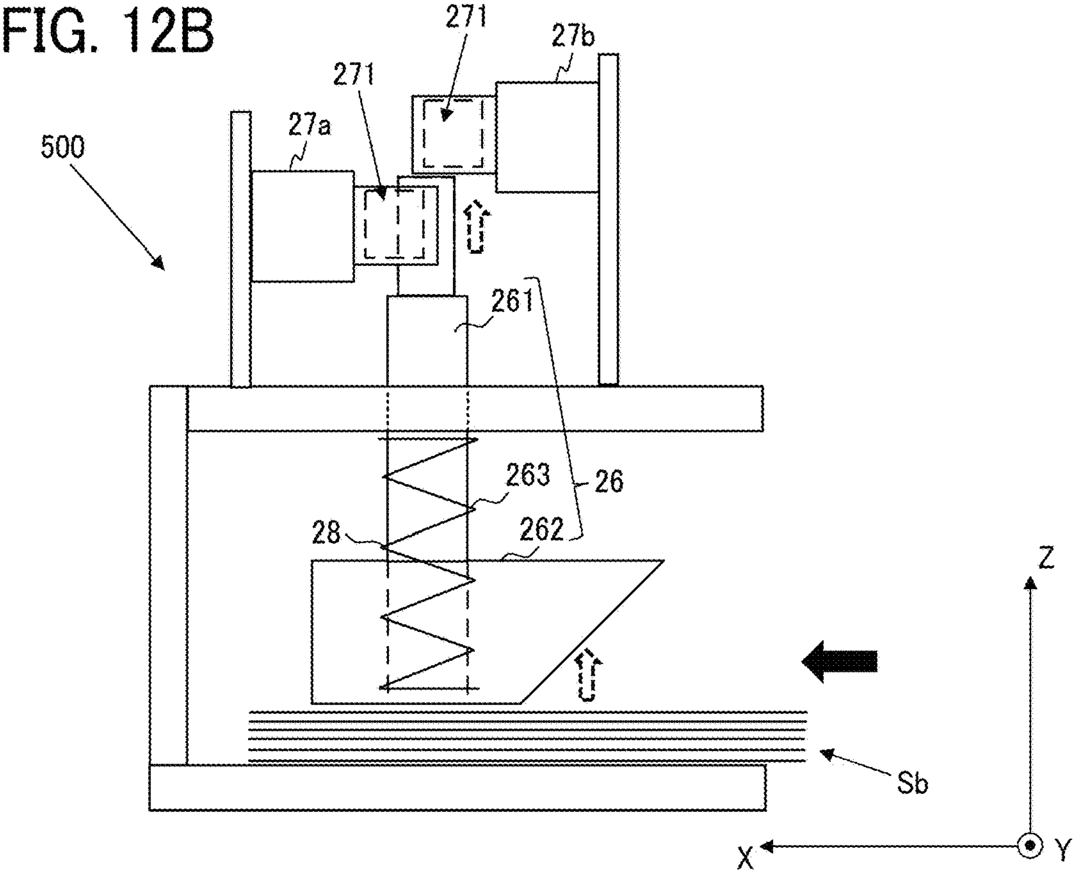

Next, a fourth embodiment of the thickness detection unit 500 will be described. FIG. 12A illustrates a state of a thickness detection configuration when the sheet bundle Sb is inserted into the slit 23 as the sheet insertion section. FIG. 12B illustrates a state of the thickness detection configuration after the sheet bundle Sb is inserted into the slit 23. Hereinafter, differences from the first embodiment and the second embodiment will be mainly described, and descriptions of the same configurations will be omitted.

As illustrated in FIGS. 12A and 12B, a plurality of thickness detection sensors 27 is installed in the moving direction of the detection member 26. With this configuration, the detection area 271 where the movement of the detection member 26 (movement of the detection portion 261) is detected is made larger in the moving direction of the detection portion 261. For example, in the moving direction of the detection member 26, a thickness detection sensor 27 located closer to the slit 23 is referred to as first thickness detection sensor 27*a*, and a thickness detection sensor located farther from the slit 23 is referred to as second thickness detection sensor 27*b*.

In this case, for example, the first thickness detection sensor 27*a* can function as a sheet bundle detection sensor that detects whether or not the sheet bundle Sb is present. The second thickness detection sensor 27*b* can function as a binding-type switching sensor used for determining a type of binding processing to be performed on the sheet bundle Sb.

Figure 13:
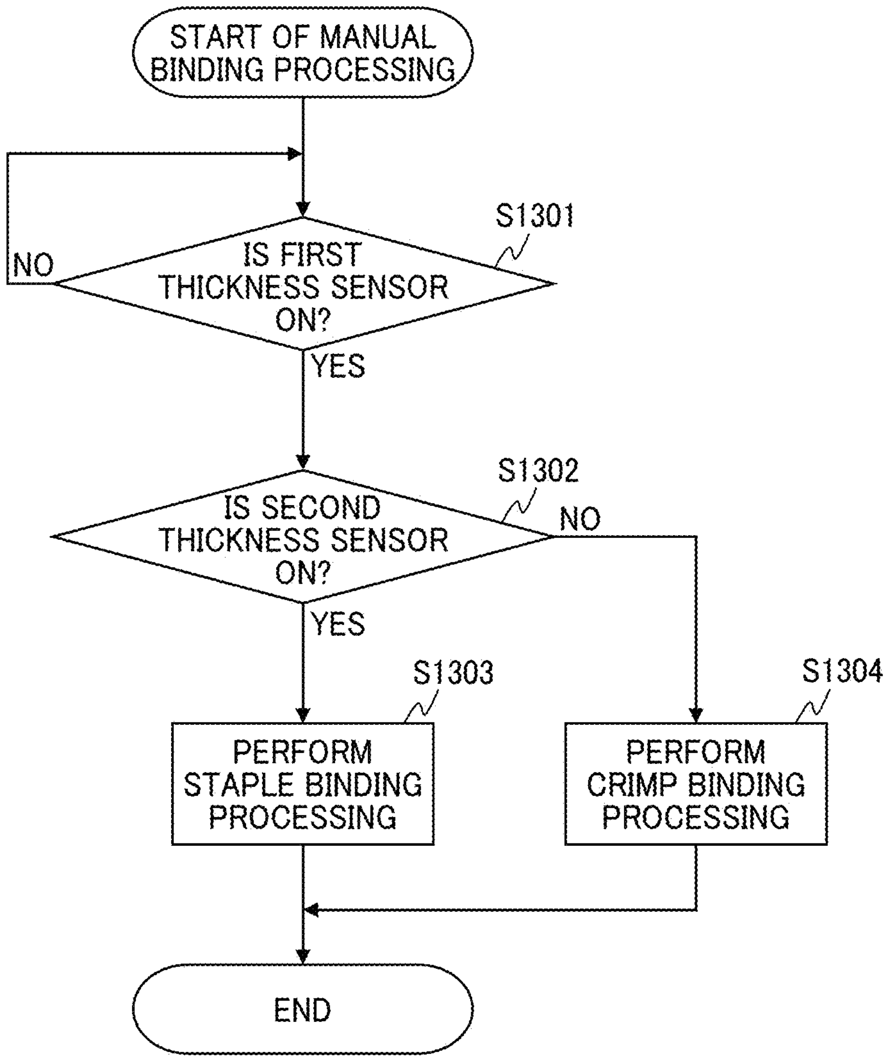
FIG. 13 is a flowchart illustrating an example of a flow of binding processing according to the present embodiment.

FIG. 13 is a flowchart illustrating a flow of processing of detecting the thickness of the sheet bundle Sb with the configuration illustrated in FIGS. 12A and 12B and determining a type of binding processing of performing the offline binding in accordance with the detection result. The processing according to the flowchart illustrated in FIG. 13 is implemented by a predetermined control program executed by the binding processing controller 102.

First, a determination is made as to whether or not the first thickness detection sensor 27*a* serving as the sheet bundle detection sensor has detected the detection portion 261 of the detection member 26 (S1301). That is, a determination is made as to whether the first thickness detection sensor 27*a* becomes "ON". When the first thickness detection sensor 27*a* has not detected the detection portion 261, the sheet bundle Sb to be subjected to binding processing has not been inserted into the slit 23. Therefore, the processing remains in a waiting state until the first thickness detection sensor 27*a* becomes ON (S1301: No).

When the first thickness detection sensor 27*a* has detected the detection portion 261 and becomes "ON" (S1301: Yes), a determination is made as to whether or not the second thickness detection sensor 27*b* has detected the detection member 26 (S1302). That is, a determination is made as to whether or not the second thickness detection sensor 27*b* becomes "ON".

When the second thickness detection sensor 27*b* has detected the detection portion 261 (S1302: Yes), that is, when the second thickness detection sensor 27*b* becomes ON, the thickness of the sheet bundle Sb is determined to correspond to the number of sheets suitable for staple binding processing (the number of sheets to be bound is relatively large). Therefore, in this case, the staple binding processing using the staple binder 19*a* as a first binding processing unit is performed (S1303).

When the second thickness detection sensor 27*b* has not detect ed the detection member 26 (S1302: No), that is, when the second thickness detection sensor 27*b* does not become ON, the thickness of the sheet bundle Sb is determined to correspond to the number of sheets suitable for crimp binding processing (the number of sheets to be bound is relatively small). Therefore, in this case, the crimp binding processing using the crimp binder 19*b* as a second binding processing unit is performed (S1304).

As described above, in the thickness detection unit 500 according to the present embodiment, a plurality of detection areas 271 is arranged in the moving direction of the detection member 26, and the amount of movement of the detection member 26 is determined on the basis of the detection state of the detection portion 261 in each detection area 271. The binding processing controller 102 can determine the thickness of the sheet bundle Sb on the basis of the magnitude of the amount of movement and performs the binding processing suitable for the thickness.

Fifth Embodiment

Figure 14:
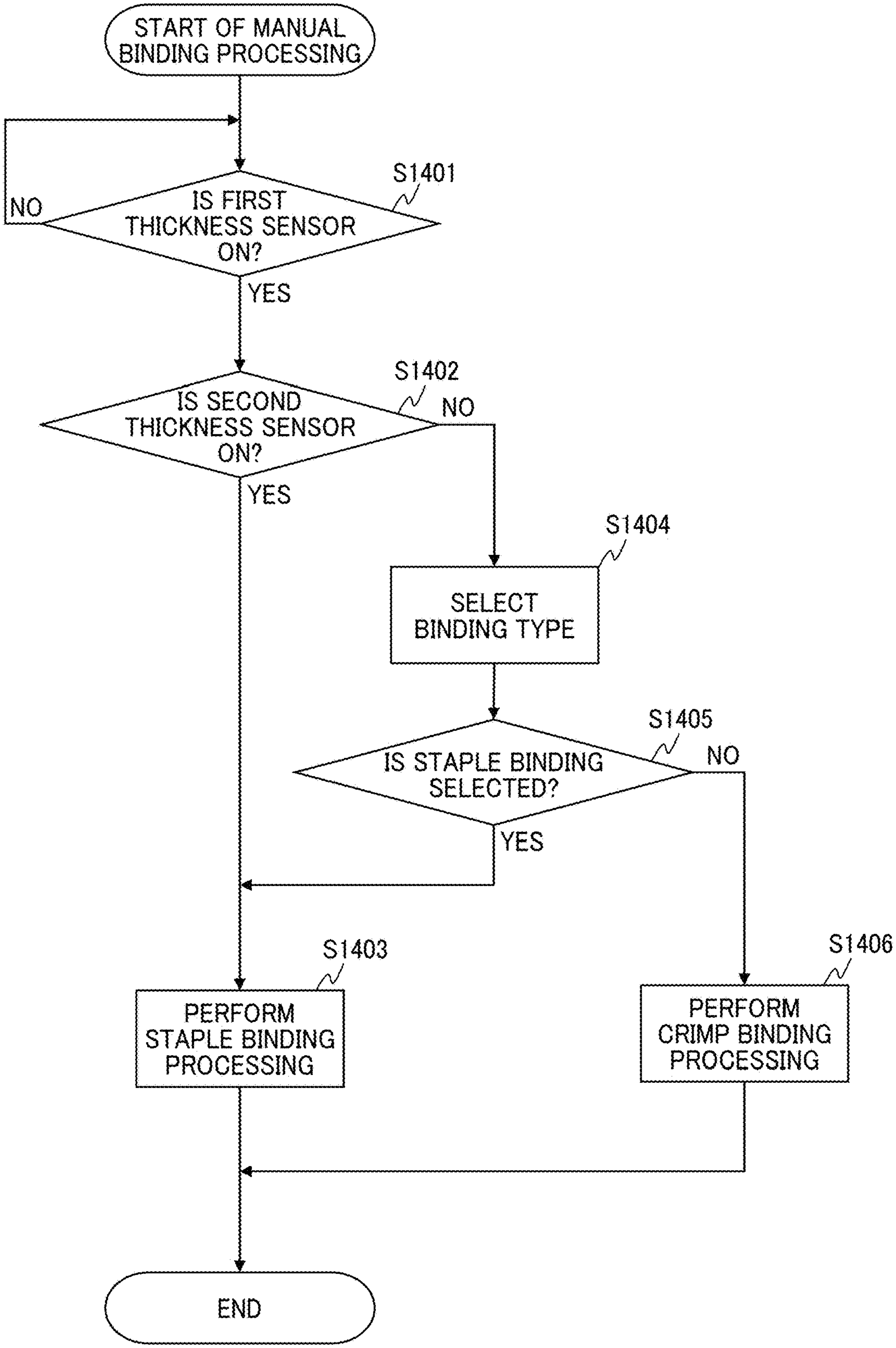
FIG. 14 is a flowchart illustrating another example of the flow of binding processing according to the present embodiment.

Next, a fifth embodiment of the binding processing unit 100 will be described. This will be described with reference to the flowchart in FIG. 14. A processing flow according to the present embodiment can be performed with a configuration where a plurality of thickness detection sensors 27 that detects the position of the detection member 26 is installed (see FIGS. 12A and 12B), as in the fourth embodiment. As in the fourth embodiment, the first thickness detection sensor 27*a* is caused to function as the sheet bundle detection sensor that detects whether or not the sheet bundle Sb is present, and the second thickness detection sensor 27*b* is caused to function as the binding-type switching sensor that switches the type of binding processing.

First, a determination is made as to whether or not the first thickness detection sensor 27*a* serving as the sheet bundle detection sensor has detected the detection member 26 (detection portion 261) (S1401). The processing loops until the first thickness detection sensor 27*a* detects the detection portion 261 (S1401: No). When the first thickness detection sensor 27*a* has detected the detection portion 261 (S1401: Yes), a determination is made as to whether or not the second thickness detection sensor 27*b* has detected the detection portion 261 (S1402).

When the second thickness detection sensor 27*b* has detected the detection portion 261 (S1402: Yes), the thickness of the sheet bundle Sb is determined to correspond to the number of sheets suitable for the staple binding processing (the number of sheets to be bound is large), and the binding processing controller 102 performs the staple binding processing using the staple binder 19*a* as the first binding processing unit (S1403).

Figure 15:
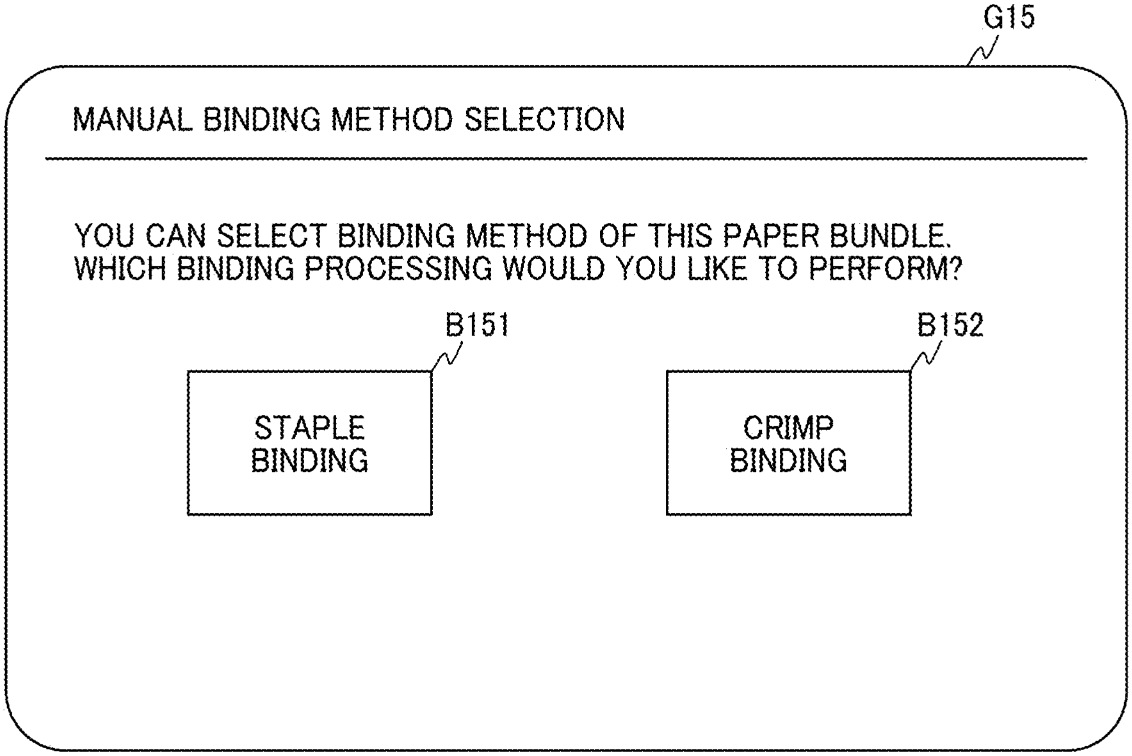
FIG. 15 is a diagram illustrating an example of a selection condition setting screen for the binding processing according to the present embodiment.

When the second thickness detection sensor 27*b* has not detected the detection portion 261 (S1402: No), the binding processing controller 102 performs binding-type selection processing (S1404). Step S1404 is a process of causing the control panel 304 to display a user interface for setting a selection condition under which the binder 19 to be used is selected. FIG. 15 is an example of a manual binding method selection screen G15 displayed on the display 303 in S1404. As illustrated in FIG. 15, a first binding selection button B151 for selecting the staple binding processing and a second binding selection button B152 are displayed.

When the first binding selection button B151 is selected in S1404 (S1405: Yes), the staple binding processing using the staple binder 19*a* as the first binding processing unit is performed (S1403).

When the second binding selection button B152 is selected (S1405: No), the crimp binding processing using the crimp binder 19*b* as the second binding processing unit is performed (S1406).

As described above, with the binding processing unit 100 according to the present embodiment, the user can select and perform any desired binding processing in accordance with the thickness of the sheet bundle Sb.

Sixth Embodiment

Figure 16:
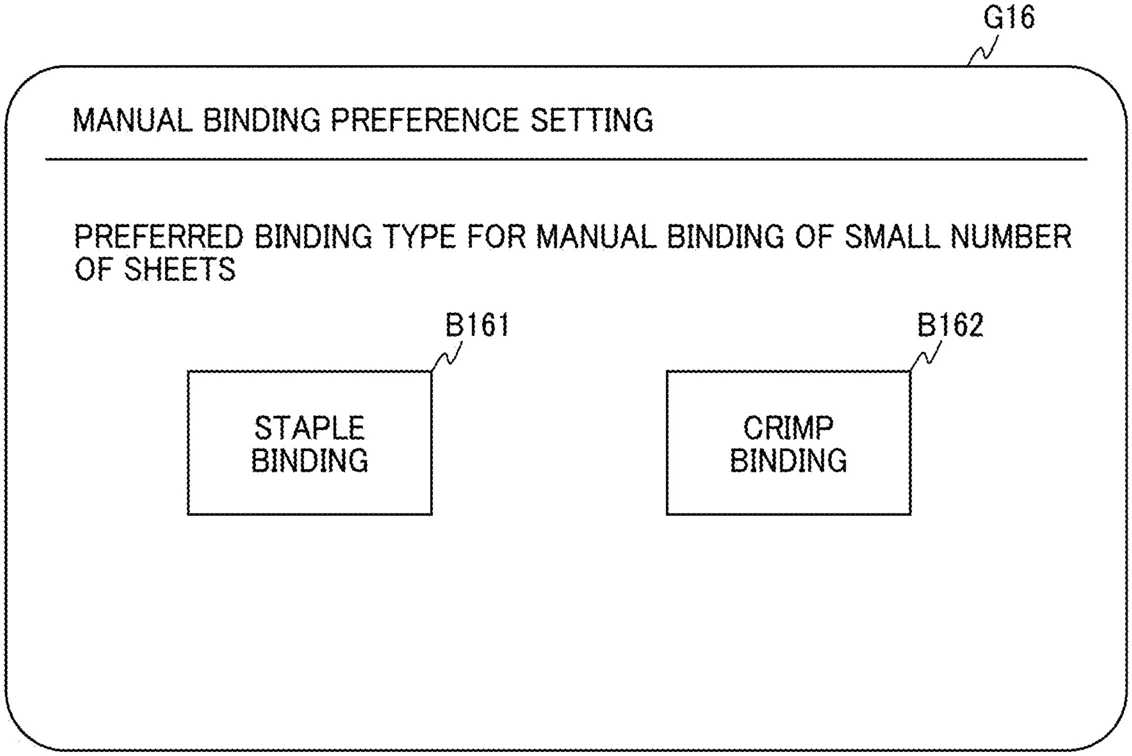
FIG. 16 is a diagram illustrating another example of the selection condition setting screen for the binding processing according to the present embodiment.

Next, a sixth embodiment of the binding processing unit 100 will be described. FIG. 16 is an example of an operation screen G16 according to the present embodiment. The operation screen G16 is displayed on the display 303, and the type of binding processing to be performed when the number of sheets of the sheet bundle Sb is smaller than a predetermined threshold can be preset.

Figure 17:
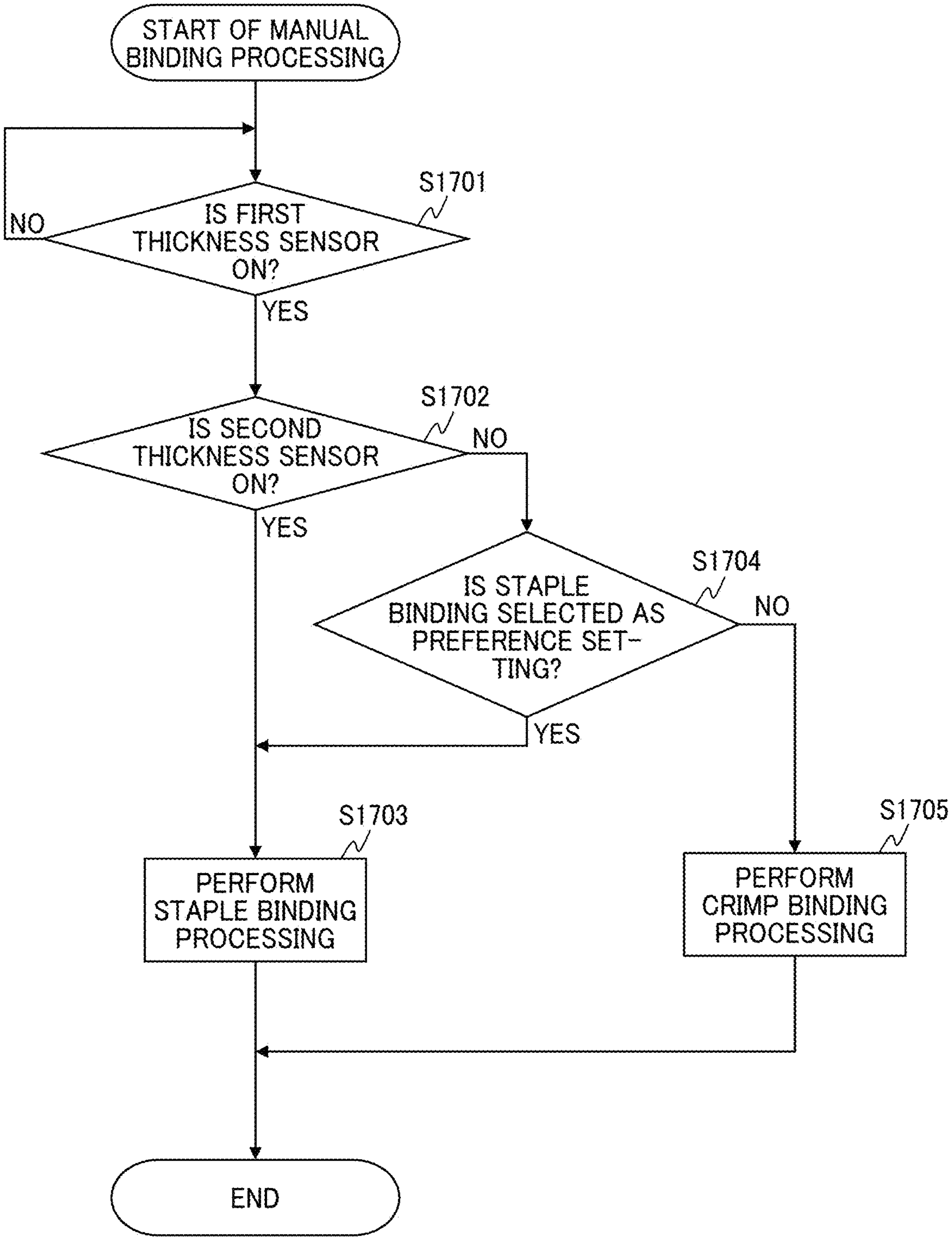
FIG. 17 is a flowchart illustrating still another example of the flow of binding processing according to the present embodiment.

FIG. 17 is a flowchart of a processing flow when the manual binding according to the present embodiment is performed. First, a determination is made as to whether or not the first thickness detection sensor 27*a* serving as the sheet bundle detection sensor has detected the detection member 26 (detection portion 261) (S1701). The processing waits until the first thickness detection sensor 27*a* detects the detection portion 261 (S1701: No). When the first thickness detection sensor 27*a* has detected the detection portion 261 (S1701: Yes), a determination is made as to whether or not the second thickness detection sensor 27*b* has detected the detection portion 261 (S1702).

When the second thickness detection sensor 27*b* has detected the detection portion 261 (S1702: Yes), the thickness of the sheet bundle Sb is determined to correspond to the number of sheets suitable for the staple binding processing (the number of sheets to be bound is large), and the staple binding processing using the staple binder 19*a* as the first binding processing unit is performed (S1703).

When the second thickness detection sensor 27*b* has not detected the detection portion 261 (S1702: No), the binding type preset as a preference setting via the operation screen G16 corresponds to the staple binding processing (S1704). When the staple binding processing is set as a preference setting in S1704 (S1704: Yes), the staple binding processing using the staple binder 19*a* as the first binding processing unit is performed (S1703).

When the staple binding processing is not set as a preference setting in S1704 (S1704: No), the crimp binding processing using the crimp binder 19*b* as the second binding processing unit is performed (S1705).

As described above, with the binding processing unit 100 according to the present embodiment, a binding type to be preferentially selected is preset, so that when binding processing is selected and performed, the user can set, as desired, binding processing to be preferentially performed in accordance with the thickness of the sheet bundle Sb.

Seventh Embodiment

Figure 18:
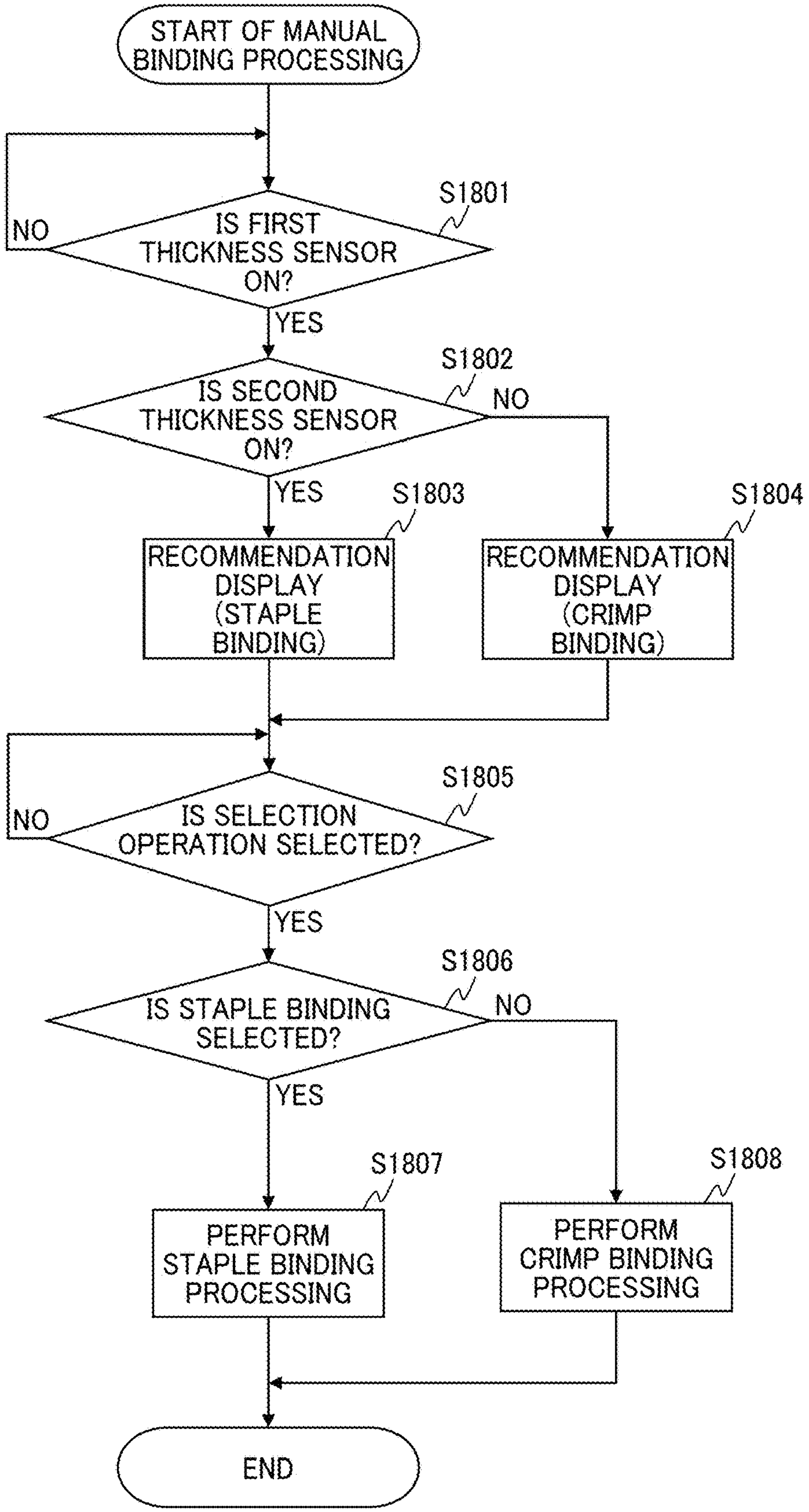
FIG. 18 is a flowchart illustrating still another example of the flow of binding processing according to the present embodiment.

Next, a seventh embodiment of the binding processing unit 100 will be described. FIG. 18 is a flowchart illustrating an example of a processing flow when the manual binding according to the present embodiment is performed. As with the fourth embodiment, the present embodiment can be applied to a configuration where a plurality of thickness detection sensors 27 that detects the position of the corresponding detection member 26 is installed. As in the fourth embodiment, the first thickness detection sensor 27*a* is caused to function as the sheet bundle detection sensor that detects whether or not the sheet bundle Sb is present, and the second thickness detection sensor 27*b* is caused to function as the binding-type switching sensor that switches the type of binding processing.

First, a determination is made as to whether or not the first thickness detection sensor 27*a* serving as the sheet bundle detection sensor has detected the detection portion 261 (S1801). The processing waits until the first thickness detection sensor 27*a* detects the detection portion 261 (S1801: No). When the first thickness detection sensor 27*a* has detected the detection portion 261 (S1801: Yes), a determination is made as to whether or not the second thickness detection sensor 27*b* has detected the detection portion 261 (S1802).

Figure 19A:
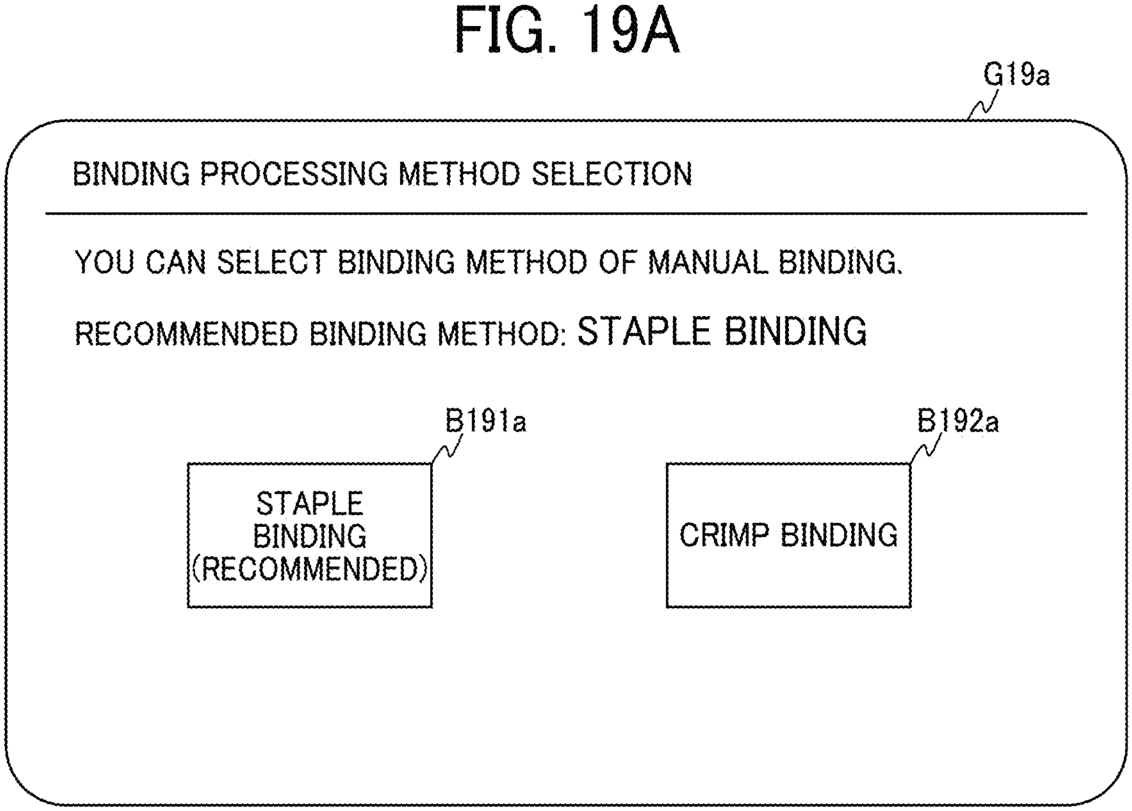
FIGS. 19A and 19B are diagrams illustrating still another example of the selection condition setting screen for the binding processing according to the present embodiment.

When the second thickness detection sensor 27*b* has detected the detection portion 261 (S1802: Yes), the thickness of the sheet bundle Sb is determined to correspond to the number of sheets suitable for the staple binding processing (the number of sheets to be bound is large), and a user interface for selecting the binder 19 to be used is displayed on the control panel 304 (S1803). FIG. 19A is an example of a manual binding method selection screen G19*a* displayed on the display 303 in S1803. As illustrated in FIG. 19A, the manual binding method selection screen G19*a* includes a first binding recommendation selection button B191*a* for recommending the selection of the staple binding processing and a second binding selection button B192*a* for selecting the crimp binding processing.

When the second thickness detection sensor 27*b* has detected the detection portion 261 (S1802: Yes), the thickness of the sheet bundle Sb corresponds to the number of sheets suitable for the staple binding processing (the number of sheets to be bound is large), so that, in S1803, the first binding recommendation selection button B191*a* is displayed more clearly, and the second binding selection button B192*a* for recommending the selection of the crimp binding processing is displayed faintly.

Figure 19B:
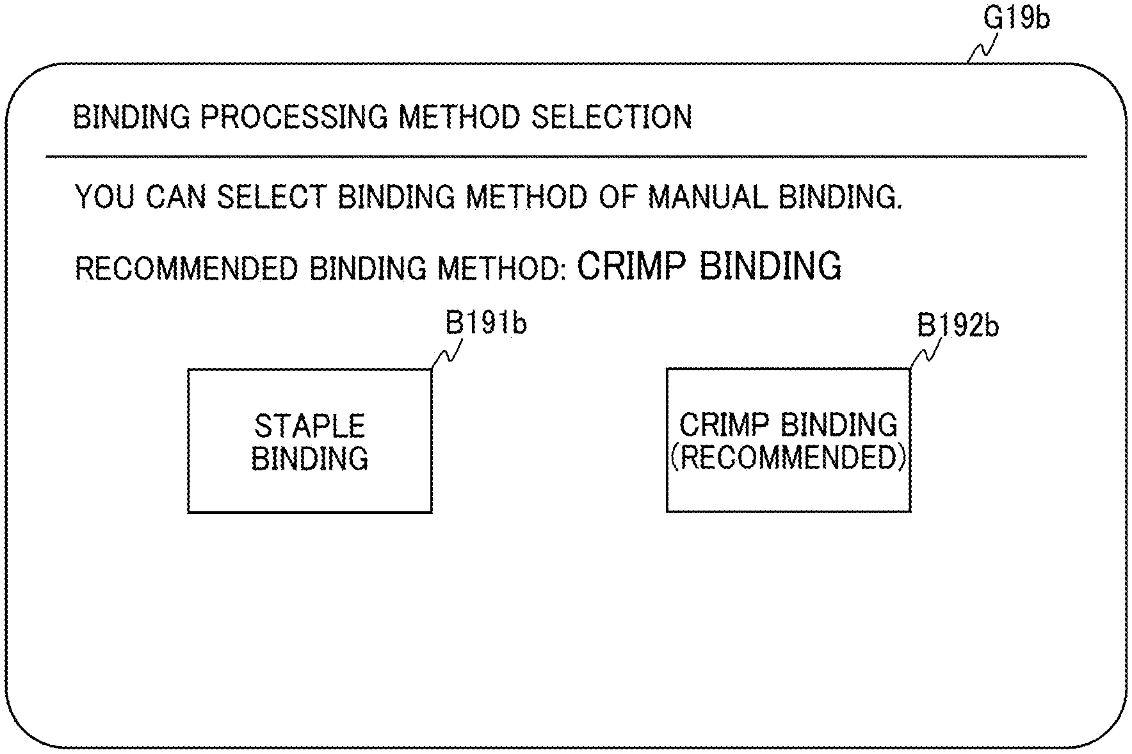

When the second thickness detection sensor 27*b* has not detected the detection member 26 (S1802: No), the thickness of the sheet bundle Sb is determined to correspond to the number of sheets suitable for the crimp binding processing (the number of sheets to be bound is small), and a user interface for selecting the binder 19 to be used is displayed on the control panel 304 (S1804). FIG. 19B is an example of a manual binding method selection screen G19*b* displayed on the display 303 in S1804. As illustrated in FIG. 19B, the manual binding method selection screen G19*b* includes a first binding selection button B191*b* for selecting the staple binding processing and a second binding recommendation selection button B192*b* for recommending the selection of the crimp binding processing.

When the second thickness detection sensor 27*b* has not detect ed the detection portion 261 (S1802: NO), the thickness of the sheet bundle Sb corresponds to the number of sheets suitable for the crimp binding processing (the number of sheets to be bound is small), so that, in S1804, the first binding selection button B191*b* is displayed faintly, and the second binding recommendation selection button B192*b* for recommending the selection of the crimp binding processing is displayed more clearly (S1804).

Subsequently, the processing loops until a selection operation is performed on either the first binding selection button B191*b* or the second binding recommendation selection button B192*b* (S1805: NO). When the selection operation is performed (S1805: YES), a determination is made as to whether or not the first binding recommendation selection button B191*a* is selected (S1806). When the first binding recommendation selection button B191*a* is selected (S1806: Yes), the staple binding processing using the staple binder 19*a* as the first binding processing unit is performed (S1807).

When the first binding recommendation selection button B191*a* is not selected (S1806: NO), the crimp binding processing using the crimp binder 19*b* as the second binding processing unit is performed (S1808).

As described above, with the binding processing unit 100 according to the present embodiment, when the binding processing is selected and performed, and the detected thickness of the sheet bundle Sb is close to the limit number of sheets that can be subjected to crimp binding, an interface for recommending the staple binding is presented to the user. Accordingly, unified binding processing can be performed.

Eighth Embodiment

Figure 20A:
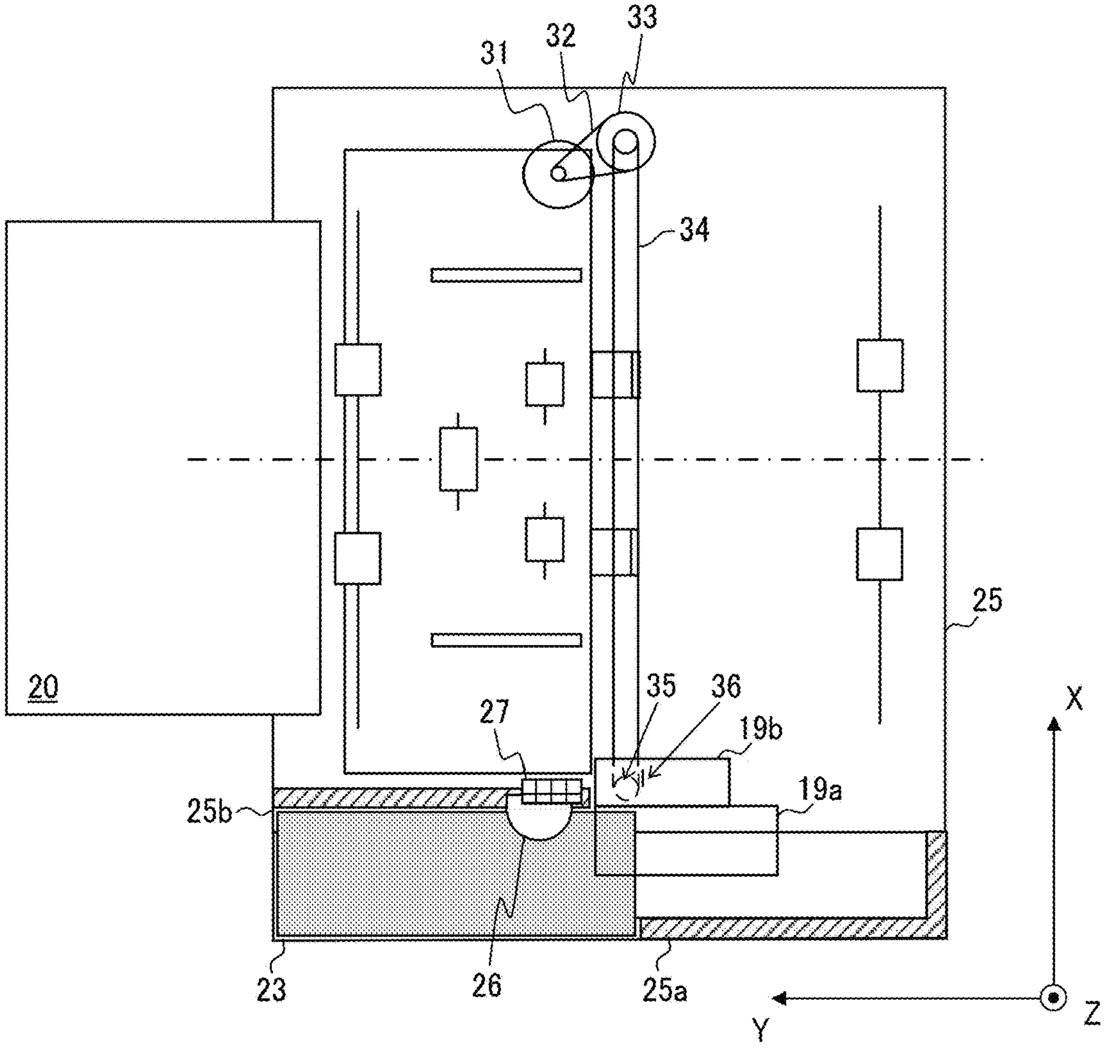
FIGS. 20A and 20B are configuration diagrams illustrating another example of the configuration of the binding processing unit according to the present embodiment.
Figure 20B:
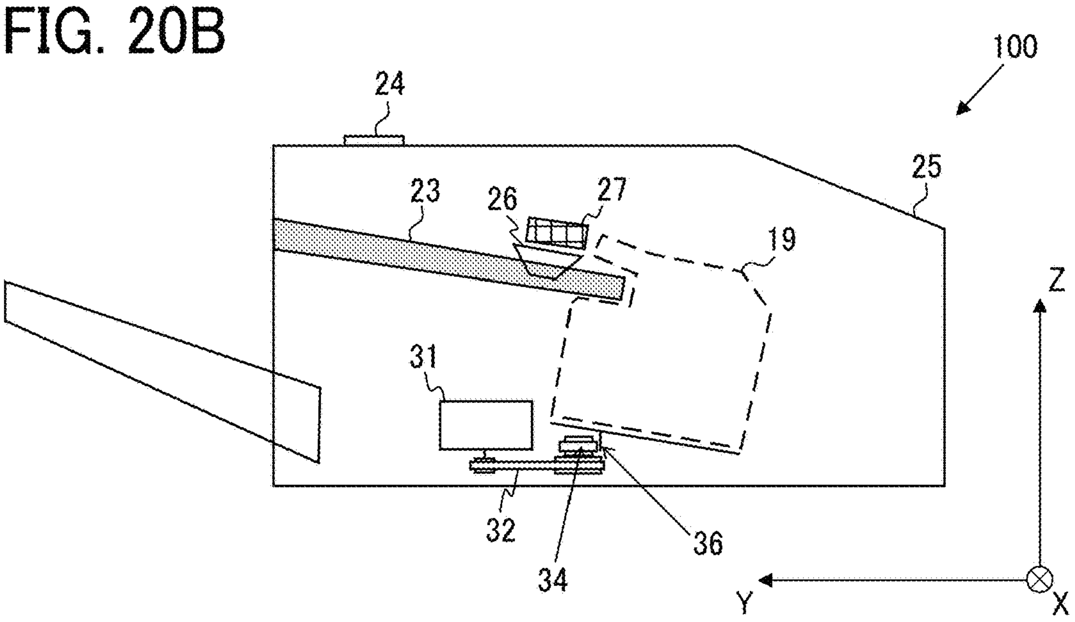

Next, an eighth embodiment of the binding processing unit 100 will be described. FIG. 20A is a plan view of a binding processing unit 100*a* according to the present embodiment. FIG. 20B is a cross-sectional view of the binding processing unit 100. The binding processing unit 100*a* as the binding processing device includes a plurality of binders 19 for various types of binding, the plurality of binders 19 serving as a processing unit that performs binding processing of bundling and binding the sheet bundle Sb.

As illustrated in FIGS. 20A and 20B, the binding processing unit 100*a* includes a binder moving mechanism 130 that scans the plurality of binders 19 in the width direction of the sheet bundle Sb to enable the binders 19 to move to a predetermined binding processing execution position.

The binder moving mechanism 130 includes, for example, a drive motor 31 that supplies a driving force for moving the binders 19, a transmission belt 32 for transmitting the driving force of the drive motor 31, a two-stage pulley 33 around which the transmission belt 32 and a drive belt 34 are wound, the drive belt 34 being wound between the two-stage pulley 33 and a pulley 35, the pulley 35 being arranged at a position opposed to the two-stage pulley 33 in the X direction, and a belt fastening member 36 that secures the binders 19 to the drive belt 34.

In the binding processing described in the first to seventh embodiments, to switch the binders 19, the drive motor 31 is rotated to move any one of the binders 19 to the binding processing execution position.

Ninth Embodiment

Figure 21:
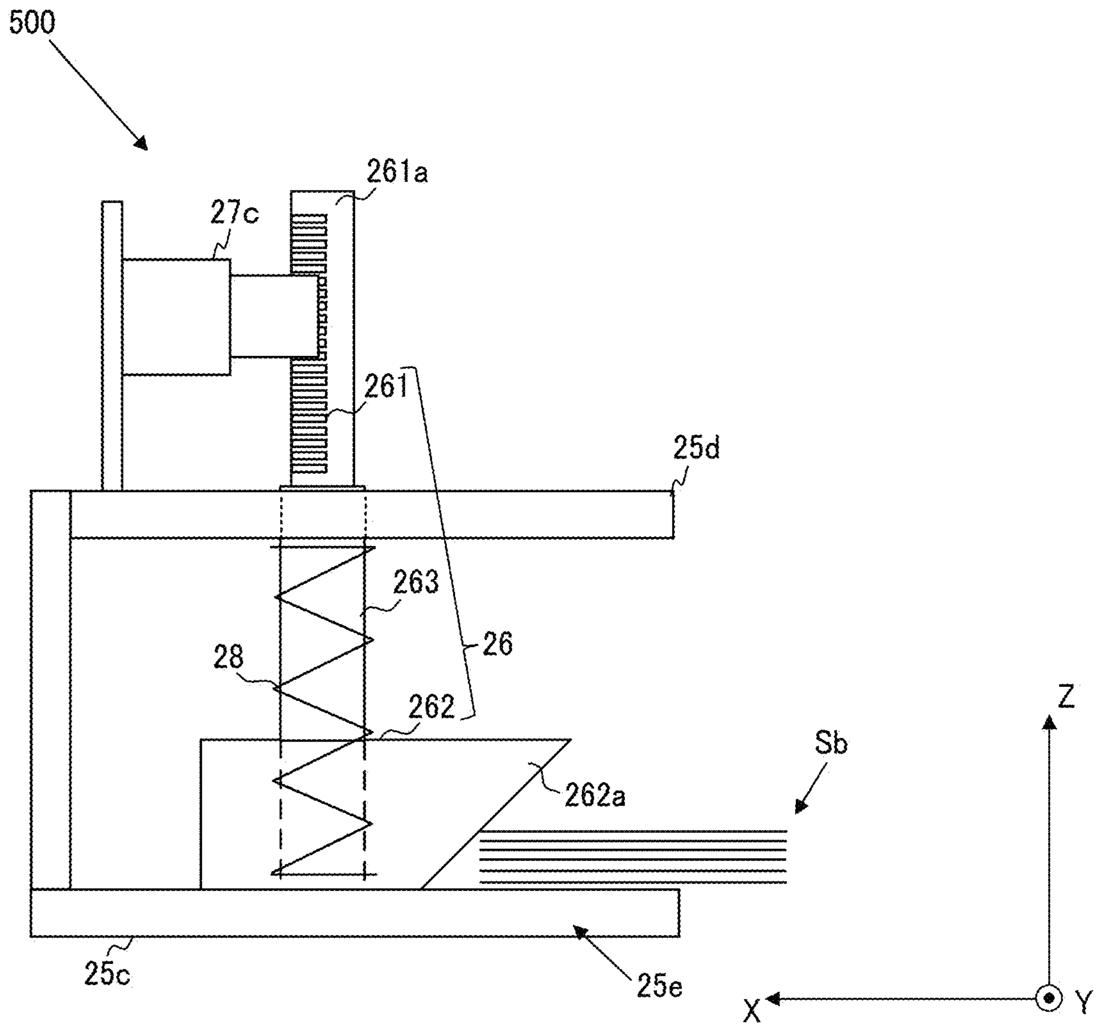
FIG. 21 is a configuration diagram illustrating still another example of the configuration of the thickness detection unit according to the present embodiment.
Figure 22A:
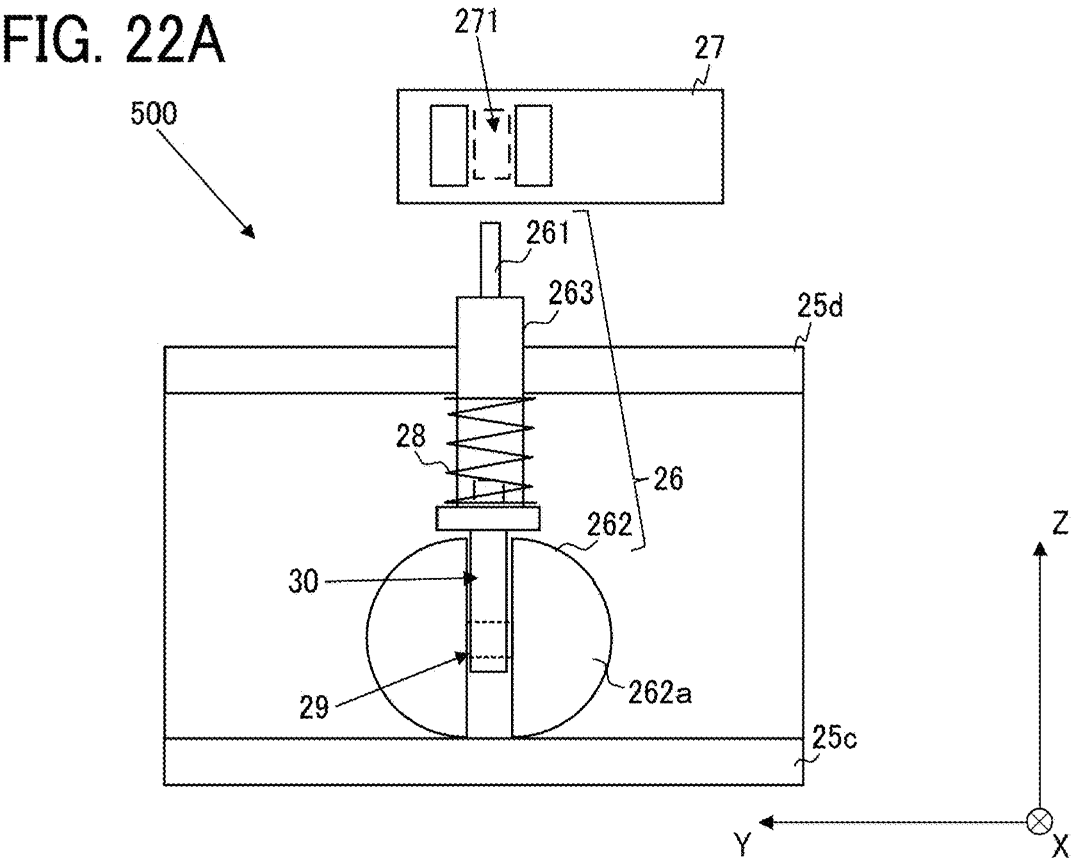
FIGS. 22A and 22B are configuration diagrams illustrating still another example of the configuration of the thickness detection unit according to the present embodiment.
Figure 22B:
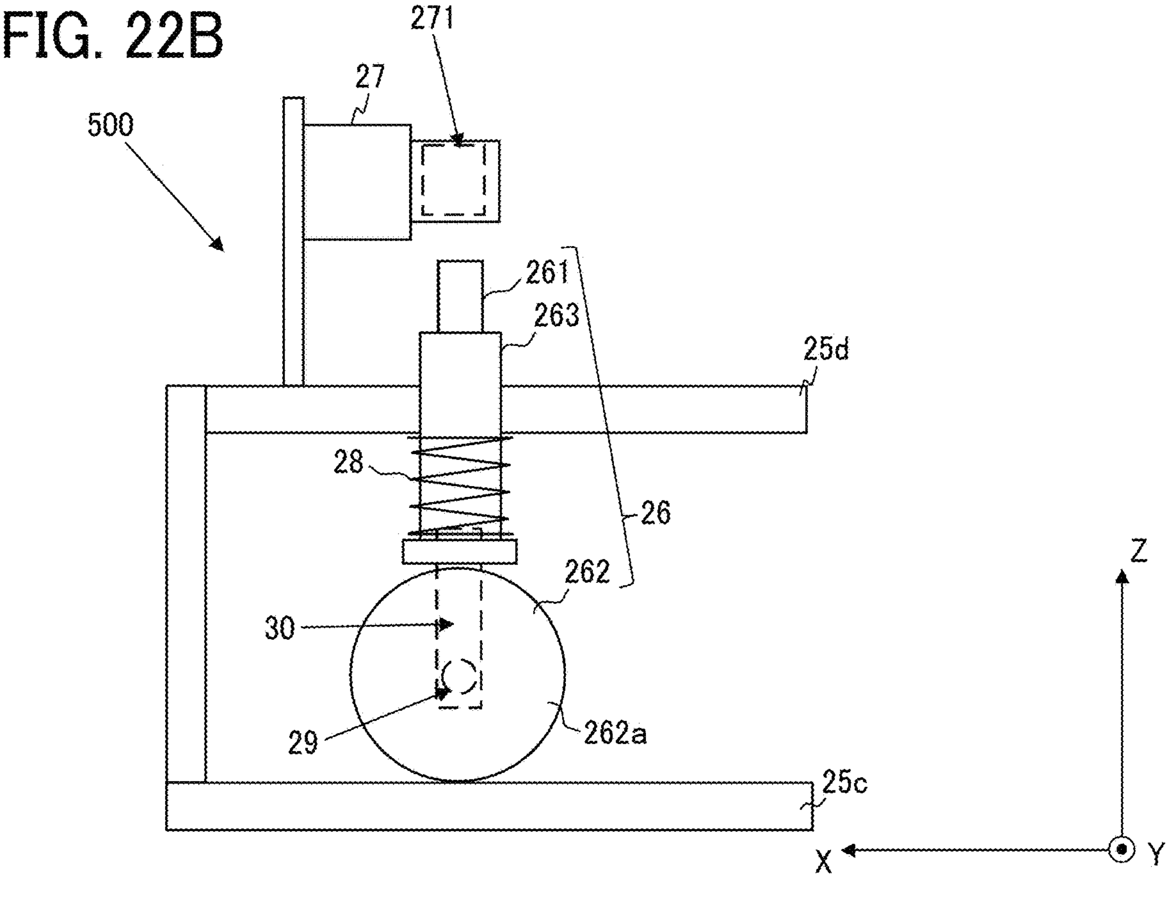

Next, a ninth embodiment of the binding processing unit 100 will be described. Hereinafter, a main configuration for detecting the thickness of the sheet bundle Sb inserted from the sheet insertion section when the manual binding processing according to the present embodiment is performed will be described. FIG. 21 illustrates a state of the detection member 26 when the sheet bundle Sb is not inserted into the slit 23. The present embodiment is different from the above-described embodiments in that an encoder sensor 27*c* is used. A comb-like detection portion 261*a* is provided in a portion related to a sensor detection range of the encoder sensor 27*c*. Hereinafter, differences from the described embodiments will be mainly described, and descriptions of the same configurations will be omitted.

In the thickness detection configuration according to the present embodiment, the encoder sensor 27*c* is used as the thickness detection sensor 27. The detection member 26 includes the comb-like detection portion 261*a* instead of the detection portion 261. The encoder sensor 27*c* can detect, by measuring the amount of movement of the comb-like detection portion 261*a*, the insertion of the sheet bundle Sb even in a case where the detection member 26 moves slightly.

It is possible to perform, by using a comparison with a threshold for the determination of the amount of movement of the detection member 26, control such as determination that the thickness is suitable for the staple binding processing in a case where the amount of movement exceeds the predetermined threshold. In this case, it is possible to implement a similar function without providing the plurality of thickness detection sensors 27 unlike the fourth embodiment (FIGS. 12A and 12B).

Tenth Embodiment

Next, a tenth embodiment of the thickness detection unit 500 will be described. Hereinafter, a main configuration for detecting the thickness of the sheet bundle Sb inserted from the sheet insertion section when the manual binding processing according to the present embodiment is performed will be described. FIG. 21 illustrates a state of the detection member 26 when the sheet bundle Sb is not inserted into the slit 23.

As already described above, the detection member 26 includes at least the detection portion 261, the object contact portion 262, and the detection member holding portion 263.

The detection member holding portion 263 is held slidable in the biasing direction of the biasing member 28 relative to the slit top surface 25*d*. The detection portion 261 that relatively moves toward the detection area 271 is provided at one end of the detection member holding portion 263.

A detection member first rotation shaft 30 is held at the other end of the detection member holding portion 263. The detection member first rotation shaft 30 is held by the detection member holding portion 263 so as to be rotatable about the longitudinal direction of the detection member holding portion 263. A detection member second rotation shaft 29 is held at an end of the detection member first rotation shaft 30.

The detection member second rotation shaft 29 extends in a direction orthogonal to the axial direction of the detection member first rotation shaft 30, and has its midpoint held rotatable relative to the detection member first rotation shaft 30. The object contact portion 262 is held at each end of the detection member second rotation shaft 29.

The object contact portion 262 according to the present embodiment is a hemispherical body obtained by dividing a sphere into two. The object contact portion 262 held by the detection member second rotation shaft 29 has a facing surface 262*a*, which is an outer peripheral surface (spherical surface), facing outward in the axial direction of the detection member second rotation shaft 29.

That is, the object contact portion 262 of the detection member 26 corresponds to a portion that comes into contact with the slit bottom surface 25*c* or the sheet bundle Sb inserted into the slit 23, and the contact portion has a spherical shape. That is, a portion of the object contact portion 262 facing the direction in which the sheet bundle is to be inserted has a spherical surface. Therefore, a portion where the inserted sheet bundle Sb comes into with the object contact portion 262 is a slope.

When the sheet bundle Sb is inserted, the detection member second rotation shaft 29 provided at the center of the detection member holding portion 263 allows the detection member 26 to rotate about a direction orthogonal to the axial direction of the detection member first rotation shaft 30 while the object contact portion 262 remains in contact with the sheet bundle Sb.

That is, the object contact portion 262 is provided so as to be rotatable about the detection member first rotation shaft 30 and the detection member second rotation shaft 29 in a manner that depends on the insertion direction of the sheet bundle. It is therefore possible to further reduce resistance when the sheet bundle is inserted to come into contact with the object contact portion 262, and is further inserted.

Eleventh Embodiment

Figure 23A:
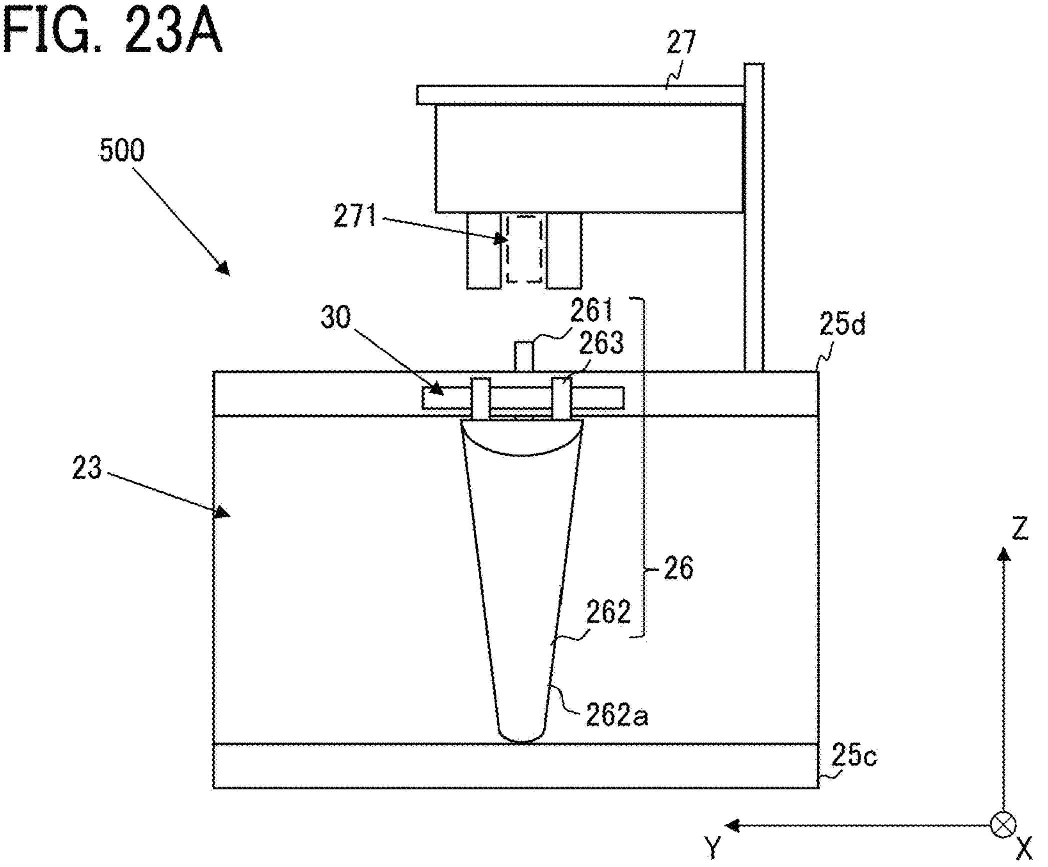
FIGS. 23A and 23B are configuration diagrams illustrating still another example of the configuration of the thickness detection unit according to the present embodiment.
Figure 23B:
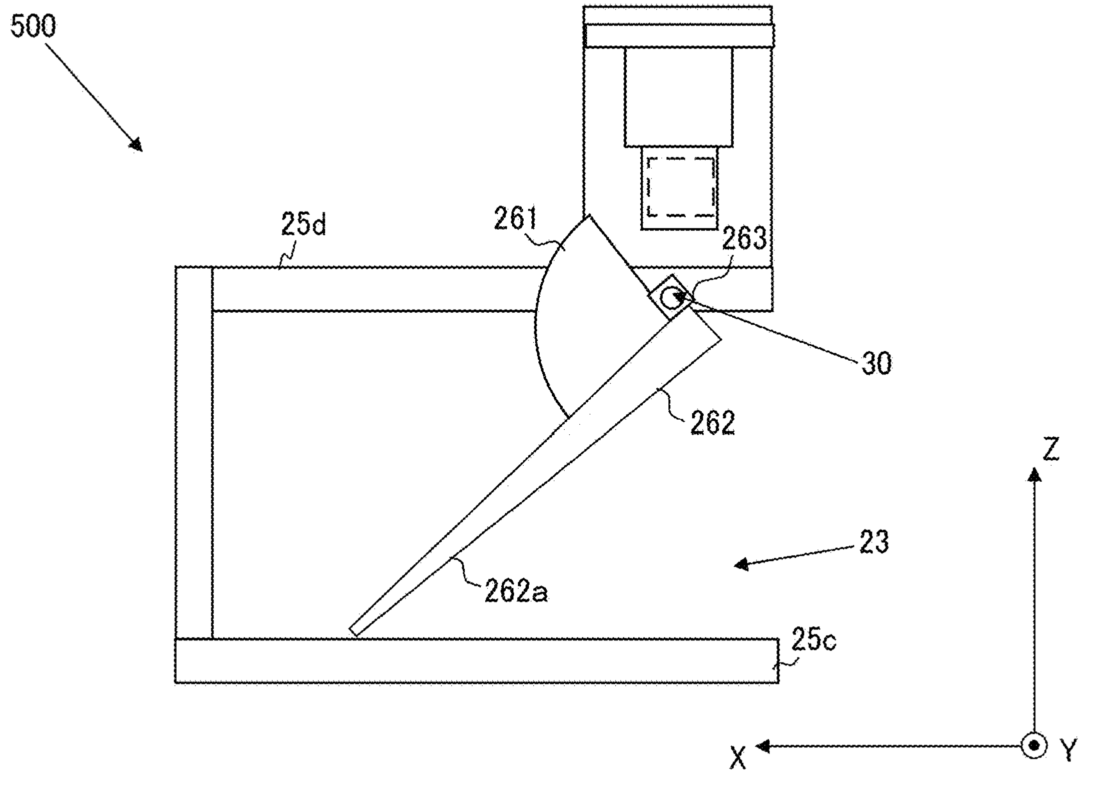
Figure 24A:
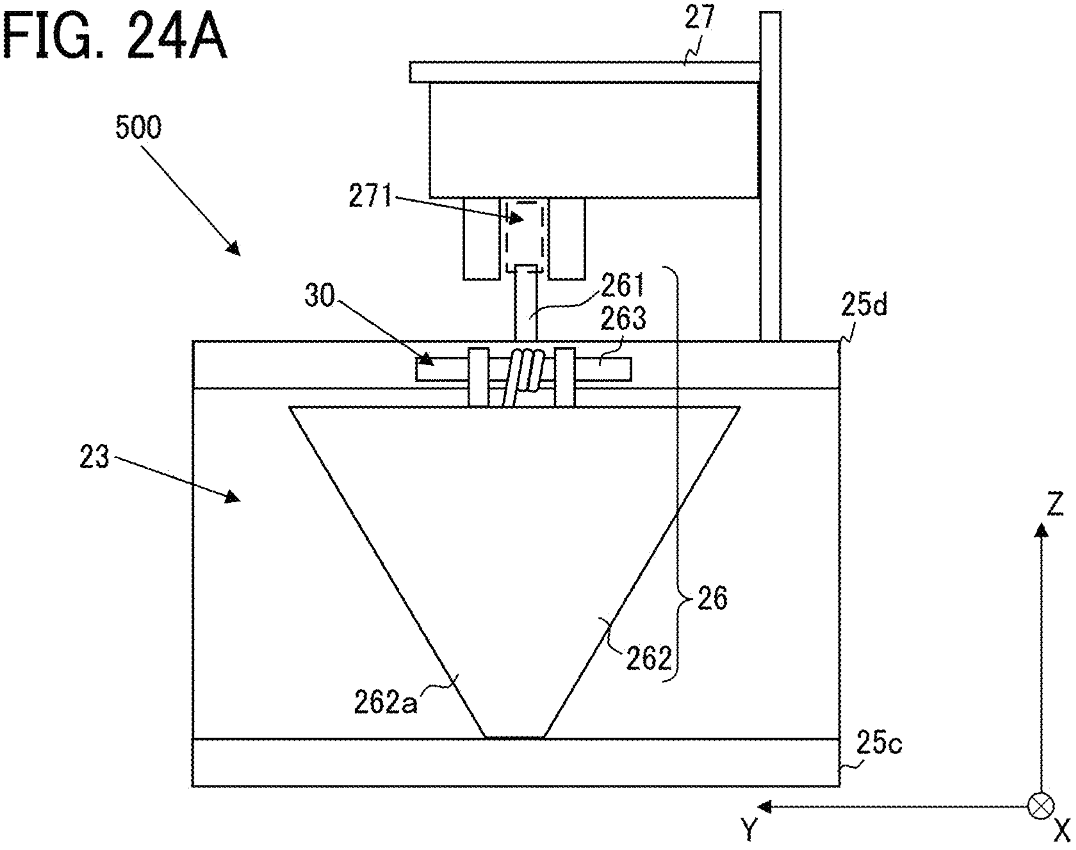
FIGS. 24A and 24B are configuration diagrams illustrating still another example of the configuration of the thickness detection unit according to the present embodiment.
Figure 24B:
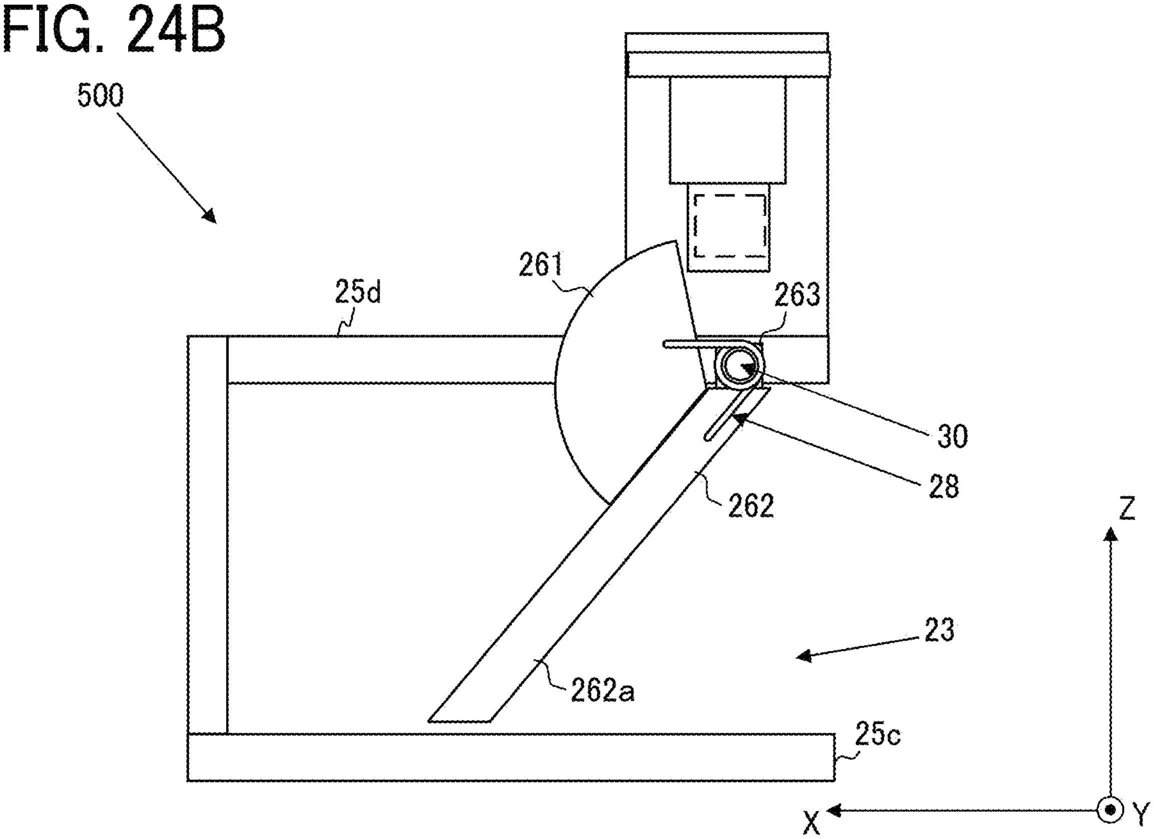
Figure 25A:
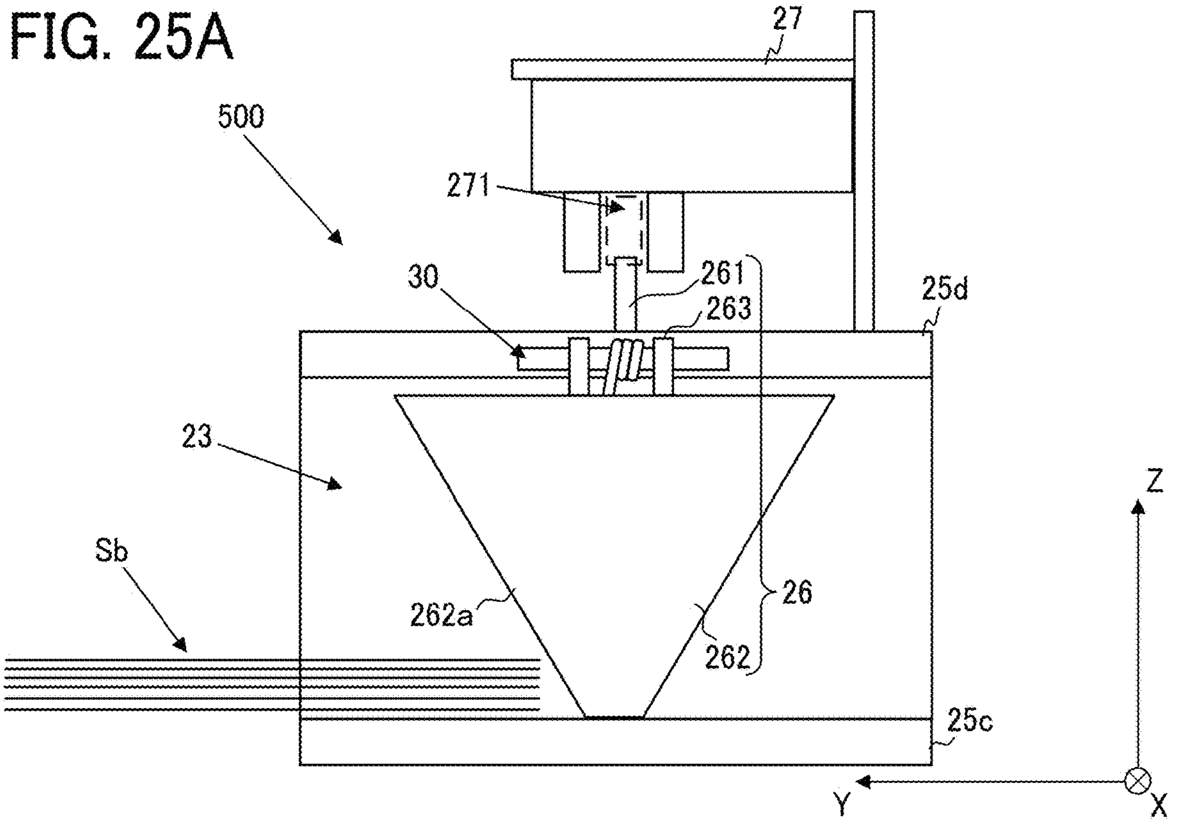
FIGS. 25A and 25B are configuration diagrams illustrating still another example of the configuration of the thickness detection unit according to the present embodiment.
Figure 25B:
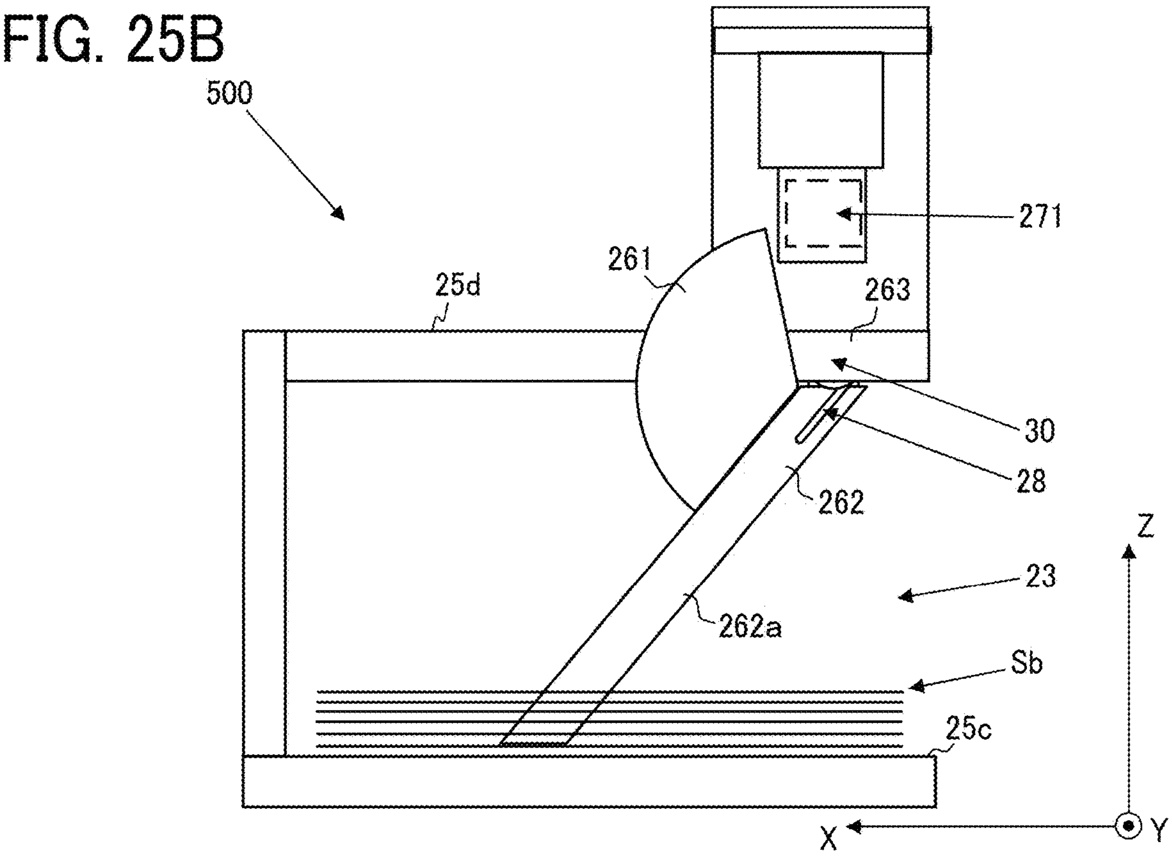

Next, an eleventh embodiment of the binding processing unit 100 will be described. FIGS. 23A and 23B illustrate a state of the detection member 26 when the sheet bundle Sb is not inserted into the slit 23.

FIG. 23A is a diagram illustrating the thickness detection unit 500 as viewed from the width direction (X direction). FIG. 23B is a diagram illustrating the thickness detection unit 500 as viewed from the ejection direction (Y direction) of the sheet S.

As illustrated in FIGS. 23A and 23B, the object contact portion 262, which is a substantially rod-shaped member, is held on the slit top surface 25*d* via the detection member holding portion 263 so as to be rotatable about the detection member first rotation shaft 30 parallel to the surface direction of the slit top surface 25*d*.

The facing surface 262*a* is inclined relative to the insertion direction of the sheet bundle Sb in the initial state. In the present embodiment, the insertion direction of the sheet bundle Sb is limited to the X direction.

When the sheet bundle Sb is inserted through the opening, the detection member 26 entirely rotates about the detection member first rotation shaft 30. This causes the detection portion 261 to move toward the detection area 271. Therefore, when the sheet bundle Sb has a thickness equal to or larger than the predetermined thickness, the detection portion 261 reaches the detection area 271, so that the thickness of the sheet bundle Sb can be detected.

The object contact portion 262 may have a plate shape as illustrated in FIGS. 24A and 24B to FIG. 26.

The object contact portion 262 may be biased by the biasing member 28 in a direction opposite to the direction in which the object contact portion 262 rotates in response to the insertion of the sheet bundle Sb.

In the thickness detection unit 500 according to the present embodiment described above, the shape of the detection member 26 is not necessarily spherical or columnar, and may be planar. With the detection member 26 held rotatable about the detection member first rotation shaft 30, biasing the detection member 26 toward the slit bottom surface 25*c* with the biasing member 28 having one end fixed to the slit top surface 25*d* allows the detection portion 261 to rotate when the sheet bundle Sb is inserted while the detection member 26 remains in contact with the sheet bundle Sb.

Figure 26:
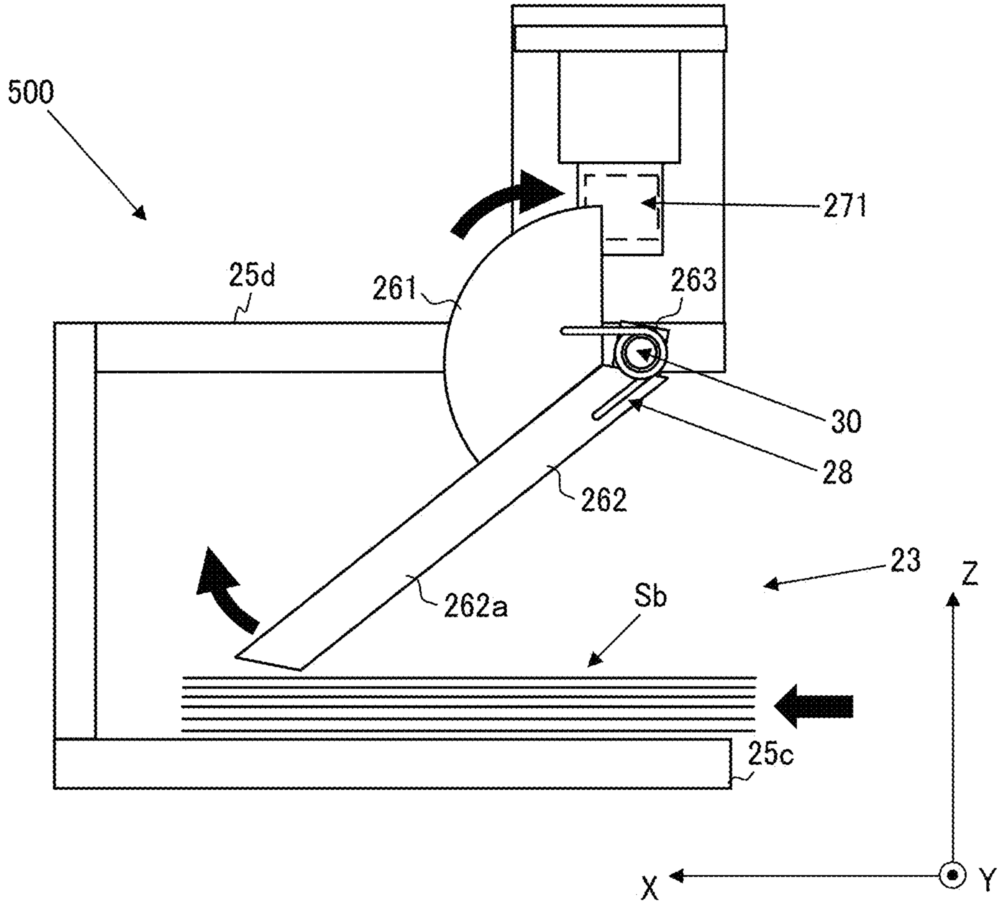
FIG. 26 is a configuration diagram illustrating still another example of the configuration of the thickness detection unit according to the present embodiment.

As illustrated in FIG. 26, the detection area 271 of the thickness detection sensor 27 is set to cover a passing range when the detection portion 261 rotates about the detection member first rotation shaft 30. Therefore, when the sheet bundle Sb is inserted to rotate the detection member 26 by a certain amount, the detection portion 261 reaches the detection area 271. Accordingly, the thickness of the sheet bundle Sb can be detected.

It is possible to switch, by adjusting the position of the thickness detection sensor 27 and the position of the passing range of the detection portion 261, uses such as the detection of the presence or absence of the sheet bundle Sb and the switching between binding types.

Twelfth Embodiment

Figure 27:
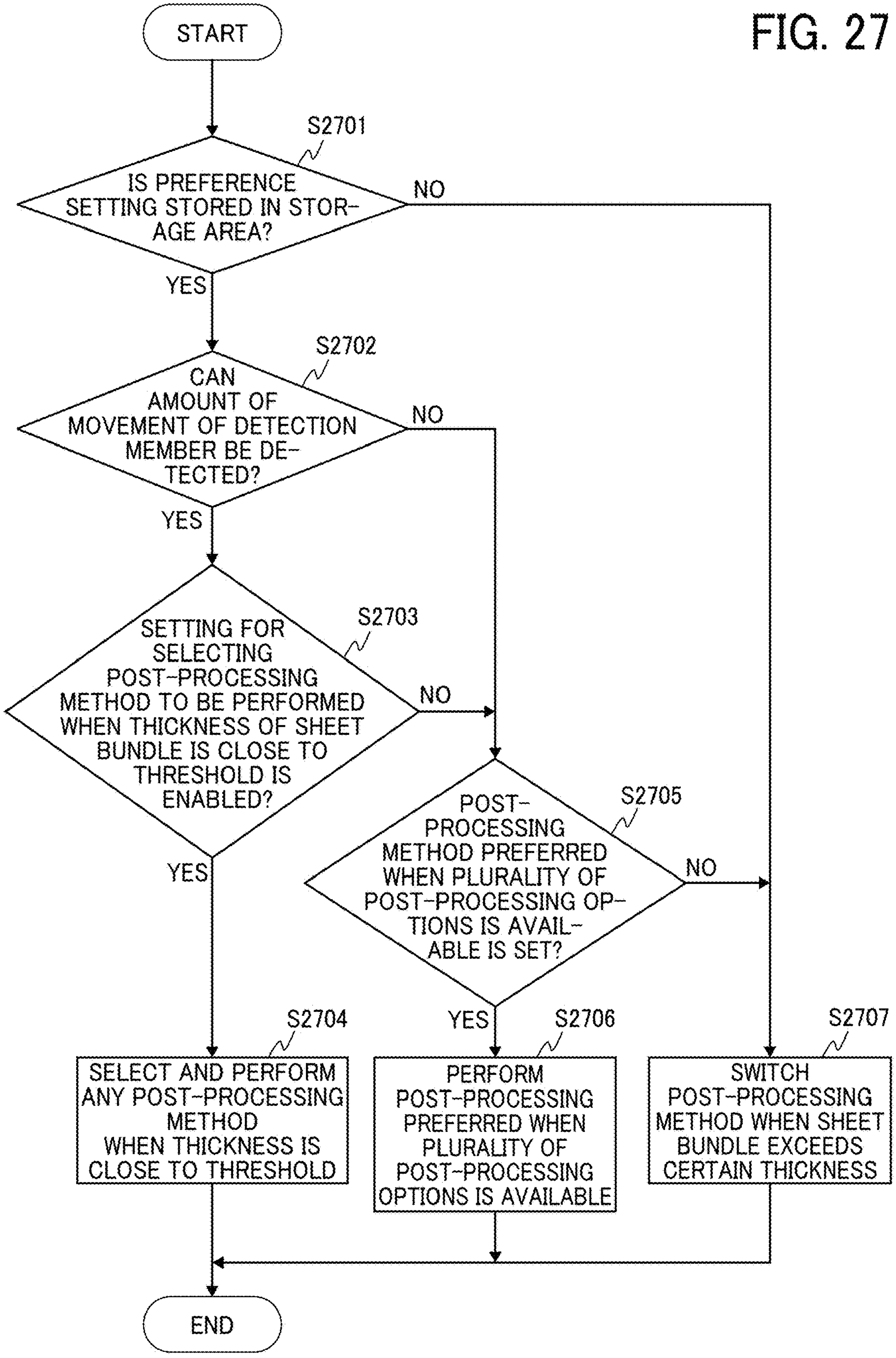
FIG. 27 is a flowchart illustrating still another example of the flow of binding processing according to the present embodiment.

Next, another example of control processing performed by the binding processing unit 100 including the thickness detection unit 500 will be described with reference to a flowchart of FIG. 27.

First, a determination is made as to whether or not the "preference setting" is stored in a storage area of the binder controller 104 included in the binding processing unit 100 (S2701). In S2701, a determination is made as to whether or not a preferred post-processing method set by the user is stored. When the preferred post-processing method is not stored (S2701: NO), processing of automatically switching the post-processing method is performed on the basis of whether or not the detection member 26 has detected the thickness equal to or greater than a threshold for switching the post-processing method (S2707).

When the preferred post-processing method is stored (S2701: YES), a determination is made as to whether or not the amount of movement of the detection member 26 can be detected (S2702). When the detection member 26 cannot detect the amount of movement (S2702: NO), a determination is made as to whether or not the post-processing method preferred when a plurality of post-processing options is available is set (S2706).

When the post-processing method preferred when a plurality of post-processing options is available is not set (S2706: NO), the processing of automatically switching the post-processing method is performed on the basis of whether or not the detection member 26 has detected the thickness equal to or greater than the threshold for switching the post-processing method (S2707).

When the post-processing method preferred when a plurality of post-processing options is available is set (S2706: YES), the post-processing preferred when a plurality of post-processing options is available is performed (S2706).

As described above, in a case where the detection member 26 has detected a thickness equal to or greater than the threshold for switching the post-processing method, a determination is made as to whether or not it is possible to detect whether or not the thickness allows the binding processing to be performed by the second binder (crimp binding) adapted to a smaller binding thickness. It is therefore necessary to determine whether or not, after exceeding the threshold, the thickness becomes too thick for the second binder (crimp binding) to perform the post-processing. As a specific configuration, it is necessary to provide a configuration having a function of detecting the limit number of sheets with an increased number of the thickness detection sensors 27 or a configuration that can detect the amount of movement of the detection member 26 as a numerical value as illustrated in the ninth embodiment.

In a case where such a configuration is not provided, it is not possible to determine whether or not post-processing can be performed by the second binder (crimp binding). Therefore, the binding processing to be performed by the first binder (staple binding) is selected when the thickness exceeds the threshold, and the post-processing is performed in accordance with the setting of the automatic or preferred post-processing method when the thickness is equal to or less than the threshold.

In S2702, when the detection member 26 can detect the amount of movement (S2702: YES), a determination is made as to whether or not the setting for selecting the post-processing method to be performed when the thickness of the sheet bundle Sb is close to the threshold is enabled (S2703). When the setting for selecting the post-processing method to be performed when the thickness of the sheet bundle Sb is close to the threshold is not enabled (S2703: NO), processing similar to when NO in S2702 is performed.

When the setting for selecting the post-processing method to be performed when the thickness of the sheet bundle Sb is close to the threshold is enabled (S2703: YES), any one of the post-processing methods is selected and performed when the thickness is close to the threshold (S2704).

Threshold for Determining Type of Binding Processing

The thickness of the sheet bundle Sb that can be bound by the staple binding processing of the first binder is denoted by "Xa", and the thickness of the sheet bundle Sb that can be bound by the crimp binding processing of the second binder is denoted by "Xb". These Xa and Xb differ in a manner that depends on the specification of the binding processing unit 100.

Therefore, for example, 20% above Xb is set as the threshold range described above. When the thickness of the sheet bundle Sb using the thickness detection sensor 27 corresponds to the threshold range, the user may select the binding type as illustrated in the fifth embodiment.

As described above, when the thickness corresponds to a predetermined value range of a binding allowable limit value, the user selects any desired binding type, and as a result, the binding type does not vary even with a slight thickness change due to wrinkles of the sheet bundle Sb or small foreign matters and a consistent binding processing result can be obtained.

For example, an apparatus includes a regulating member to regulate the thickness of a sheet bundle, and performs binding processing by causing the regulating member to regulate the sheet bundle according to the binders that are different in the number of sheets that the binders can bind.

In such a configuration, an optical sensor is used as a physical sensor to measure the thickness of the sheet bundle. With the configuration, the thickness of the sheet bundle is measured by a method where the optical sensor causes light to reflect off an uppermost piece of the sheet bundle to directly measure the position of the sheet bundle.

Such a configuration may lead to the possibility that, in a case where the uppermost sheet piece of the sheet bundle to be subjected to offline binding has a factor (for example, a formed image) that causes reflectivity of light to vary, the accuracy of thickness measurement decreases.

There is another possibility that, in a case where a detection member that directly comes into contact with the uppermost piece of the sheet bundle to measure the thickness is used instead of the optical sensor, the resistance increases in a manner that depends on an insertion direction of the sheet bundle, and an end of the sheet piece (uppermost piece) suffers damage such as curling up.

As described above, according to the above-described embodiments, a sheet processing apparatus can enhance the accuracy of detecting the thickness of a sheet bundle and reduce the damage when the sheet bundle is inserted in offline binding.

Embodiments of the present disclosure are not limited to the above-described embodiments, and numerous additional modifications and variations are possible in light of the teachings within the technical scope of the present disclosure. It is therefore to be understood that the above-described embodiments of the present disclosure may be practiced otherwise by those skilled in the art than as specifically described herein. Such modifications are included in the technical scope described in the scope of claims. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The contents of the present disclosure are, for example, as follows.

First Aspect

According to a first aspect, a thickness detection device that detects a thickness of an object includes: a thickness-direction moving member held to be movable in a direction of the thickness by the object inserted into a cavity having an opening that opens in a plurality of directions; and a thickness detector to detect the thickness-direction moving member moved by the object inserted into the cavity to detect the thickness of the object. The thickness-direction moving member has a portion to face the object inserted into the cavity. The portion has a shape inclined relative to an insertion direction of the object.

Second Aspect

According to a second aspect, in the thickness detection device of the first aspect, the thickness-direction moving member is biased in the thickness direction of the object, a depression recessed in a biasing direction is formed in a part of a surface constituting the cavity, and the thickness-direction moving member is in contact with the depression when the thickness-direction moving member is not moved by the object.

Third Aspect

According to a third aspect, in the thickness detection device of the first or second aspect, the thickness-direction moving member is disposed in the vicinity of an end of one of a plurality of openings of the cavity.

Fourth Aspect

According to a fourth aspect, a sheet processing apparatus includes: a binding processing device including a binder that binds a sheet bundle in which a plurality of sheet media are stacked, the sheet bundle being the object; a controller to control an operation of the binding processing device in accordance with a thickness of the sheet bundle; and the thickness detection device according to any one of the first to third aspects to detect the thickness of the sheet bundle. The binding processing device includes a plurality of binders to perform a plurality of different types of binding processing. The controller selects one binder of the plurality of binders in accordance with the thickness and causes the one binder to perform binding processing.

Fifth Aspect

According to a fifth aspect, the sheet processing apparatus of the fourth aspect further includes a setting device to make a setting for enabling binding processing to be performed using one binder of the plurality of binders selectable in accordance with the thickness.

Sixth Aspect

According to a sixth aspect, in the sheet processing apparatus of the fifth aspect, when a user changes the setting via the setting device after the one binder is set in accordance with the thickness, the controller controls the binding processing to be selected and performed in accordance with the changed setting.

Seventh Aspect

According to a seventh aspect, in the sheet processing apparatus of the fifth aspect, when a selection condition under which the one binder is selected in accordance with the thickness is set, the controller controls the binding processing to be selected and performed on a basis of the thickness and the selection condition.

Eighth Aspect

According to an eighth aspect, an image forming system includes: an image forming apparatus to form an image on a sheet; and the sheet processing apparatus according to any one of the fourth to sixth aspects coupled to the image forming apparatus.

The invention claimed is:

1. A thickness detection device to detect a thickness of an object, the thickness detection device comprising:

a thickness-direction moving member configured to move in a direction of the thickness by the object, wherein
 the thickness detection device defines a cavity and an opening connected to the cavity,
 the cavity is configured to receive the object and the thickness-direction moving member is configured to move in response to the object being received in the cavity, and
 the opening opens in a plurality of directions; and a thickness detector configured to detect the thickness-direction moving member moved in response to the object being received in the cavity to detect the thickness of the object, wherein
 the thickness-direction moving member has a portion that faces the object being received in the cavity, the portion having a shape inclined relative to an insertion direction of the object,
 the thickness-direction moving member is configured to be biased in a thickness direction of the object, and
 the cavity is defined by a surface of the thickness detection device, and the surface defines a depression in the cavity, the depression being recessed in a biased direction of the thickness-direction moving member, and the depression being configured to receive at least a portion of the thickness-direction moving member in the depression in absence of the object in the cavity.

2. The thickness detection device according to claim 1, wherein the thickness-direction moving member is in a vicinity of an end of the cavity in one of the plurality of directions.

3. A sheet processing apparatus, comprising:

a binding processing device configured to bind a bundle of sheets as the object, the binding processing device including a plurality of binders configured to perform a plurality of different types of binding processing;

the thickness detection device according to claim 1 configured to detect a thickness of the bundle of sheets; and processing circuitry configured to control the binding processing device to perform an operation in accordance with the thickness of the bundle of sheets, wherein the processing circuitry is configured to,
 select one binder of the plurality of binders in accordance with the thickness of the bundle of sheets; and
 cause the one binder to perform binding processing.

4. The sheet processing apparatus according to claim 3, further comprising a setting device configured to make a setting to enable binding processing to be performed using one binder of the plurality of binders, the one binder being selected in accordance with the thickness of the bundle of sheets.

5. The sheet processing apparatus according to claim 4, wherein, when the setting is changed via the setting device after the one binder is set in accordance with the thickness of the bundle of sheets, the processing circuitry is configured to control the binding processing to be selected and performed in accordance with a changed setting.

6. The sheet processing apparatus according to claim 4, wherein, in response to a selection condition being set under which the one binder is selected in accordance with the thickness of the bundle of sheets, the processing circuitry is configured to control the binding processing to be selected and performed in accordance with the thickness of the bundle of sheets and the selection condition.

7. An image forming system, comprising:

an image forming apparatus configured to form an image on a sheet; and the sheet processing apparatus according to claim 3 coupled to the image forming apparatus.

8. The thickness detection device according to claim 1, wherein the depression is configured such that the portion of the thickness-direction moving member is below the surface when the thickness-direction moving member is in the depression.

* * * * *